United States Patent
Gobuyan et al.

[19]

[11] Patent Number: 5,917,821
[45] Date of Patent: Jun. 29, 1999

[54] LOOK-UP ENGINE FOR PACKET-BASED NETWORK

[75] Inventors: Jerome Gobuyan, Kanata; Wayne Burwell, Ottawa; Nutan Behki, Nepean, all of Canada

[73] Assignee: Newbridge Networks Corporation, Kanata, Canada

[21] Appl. No.: 08/663,263

[22] PCT Filed: Dec. 21, 1994

[86] PCT No.: PCT/CA94/00695

§ 371 Date: Aug. 16, 1996

§ 102(e) Date: Aug. 16, 1996

[87] PCT Pub. No.: WO95/18497

PCT Pub. Date: Jul. 6, 1995

[30] Foreign Application Priority Data

Dec. 24, 1993 [GB] United Kingdom ............... 9326476

[51] Int. Cl.⁶ .................................................. H04L 12/46
[52] U.S. Cl. ......................................... 370/392; 370/401
[58] Field of Search .................................. 370/392, 395, 370/400, 401–405, 465, 466, 351, 389, 396, 397, 474; 395/200.68

[56] References Cited

U.S. PATENT DOCUMENTS 5,095,480  3/1992  Fenner ........................... 370/238
5,463,777  10/1995  Bialkowski et al. ............. 370/256

*Primary Examiner*—Chau Nguyen
*Attorney, Agent, or Firm*—Marks & Clerk

[57] ABSTRACT

An arrangement is disclosed for parsing packets in a packet-based data transmission network. The packets include packet headers divided into fields having values representing information pertaining to the packet. The arrangement includes an input receiving fields from the packet headers of incoming packets, a memory for storing information related to possible values of said fields, and a device for retrieving the stored information appropriate to a received field value. The retrieving device comprises a look-up engine including at least one memory organized in a hierarchical tree structure, and a controller for controlling the operation of the memory. The arrangement is capable of performing fast look-up operations at a low cost of implementation.

29 Claims, 11 Drawing Sheets

LOOK-UP ENGINE FOR PACKET-BASED NETWORK

BACKGROUND OF THE INVENTION

FIELD OF THE INVENTION

This invention relates to the field of data communications, and more particularly to packet-based digital communications networks.

There are two broad classes of network: circuit-based and packet-based. Conventional telephone networks are circuit based. When a call is established in a circuit-based network, a hard-wired connection is set up between the calling parties and remains in place for the duration of the call. Circuit-based networks are wasteful of available bandwidth and lack flexibility.

Packet-based networks overcome many of the disadvantages of circuit-based networks. In a packet-based network, the data are assembled into packets containing one or more address fields which define the context of a packet, such as protocol type and relative positions of other fields embedded in the packet. LAN bridges and routers use the information in the packet to forward it to the destination.

In a packet-based network, a packet must be parsed as it flows through the network. Parsing is the process of extracting and analyzing the information, such as source and destination address and net layer protocol, contained in the packets.

In known networks, packet parsing is generally performed with a microprocessor, which provides flexibility in handling different packet types and can be upgraded to handle new packet types as they are defined. Content Addressable Memory (CAM) is commonly used for hardware assistance to speed up searches through a list of known addresses. This is a tedious task. CAMs are also relatively expensive and limited in size and availability.

General purpose processor architectures are not specifically directed toward the types of operations required in packet parsing and so they tend to be inefficient. To meet performance requirements, a fast but expensive processor based solution can be implemented. In the highest performance systems, hardware solutions are implemented to increase speed, but at the cost of flexibility.

SUMMARY OF THE INVENTION

An object of the invention is to provide a fast, but inexpensive solution to the problem of packet-parsing in packet-based networks.

According to the present invention there is provided an arrangement for parsing packets in a packet-based digital communications network, said packets including packet headers divided into fields having values representing information pertaining to the packet, said arrangement comprising an input memory for receiving fields from said packet headers of incoming packets; and a look-up engine for retrieving stored information appropriate to a received field value. The look-up engine includes at least one memory storing information related to possible values of said fields in a hierarchical tree structure and associated with a respective field of packet headers; a memory controller associated with each said memory storing information related to possible values of said fields for controlling the operation thereof to retrieve said stored information therefrom; and a microcode controller for parsing a remaining portion of the packet header while said stored information is retrieved and controlling the overall operation of said look-up engine.

The memory and retrieving means constitute a look-up engine, which is the central resource containing all information necessary for forwarding decisions. In a preferred embodiment the look-up engine includes a source address look-up engine and a destination address look-up engine.

In a packetized data transmission conforming to IEEE802 standards, the packets have a MAC (medium access control) header containing information about the destination and source addresses and the net layer protocol. The invention permits packet switching to be achieved in a bridge-router, for example an Ethernet to ATM bridge-router, at a rate of about 178,000 packets per second using 64 byte minimum Ethernet packets. This means that the MAC headers are interpreted once every 5.6 micro seconds.

The look-up engine preferably employs table look-ups using nibble indexing on variable portions of the packet, such as MAC and network layer addresses, and bit pattern recognition on fixed portions for network layer protocol determination.

Each look-up table is organized into a hexadecimal search tree. Each search tree begins with a 16 word root table. The search key (e.g. MAC address) is divided into nibbles which are used as indices to subsequent tables. The 16 bit entry in the table is concatenated with the next 4 bit nibble to form the 20 bit address of the next 16 word table. The final leaf entries point to the desired information.

Bit pattern recognition is achieved by a microcode instruction set. The microcode engine has the ability to compare fields in a packet to preprogrammed constants and perform branches and index increments in a single instruction cycle typically. The microcode engine has complete control over the search procedure, so it can be tailored to specific look-up functions. New microcode is downloaded as new functions are required.

The look-up engine can perform up to two tree searches in parallel with microcode execution. Look-up time is quick because the microcode determines the packet's network layer format while the source and destination addresses are being searched in parallel. The results of the source and destination look-ups and the protocol determination arrive at roughly the same time, at which point the next level of decisions is made.

The look-up engine also performs protocol filtering between areas. The system allows devices to be grouped arbitrarily into areas on a per protocol basis and defines filtering rules among these areas. The look-up engine keeps track of each station's area for each of its protocols. The source and destination areas are cross-indexed in a search tree, which is used to find the filtering rule between the two areas. Separate filtering rules are defined for bridging and network layer forwarding; bridging is normally allowed within an area while network layer forwarding is selectively allowed between areas.

The parsing controller typically has a pointer to the current field in the packet being examined. The controller moves this pointer to the next field in the packet after all decisions based on the current field are made.

At each decision point on a tree, the current field is compared to a known value or range. If the comparison yields a true condition, the controller moves to the next decision point by moving the current field pointer. Otherwise the field pointer is left alone and controller branches to new code to compare the current field to a different value or range. This process is repeated until a final decision is made.

Moving to the next decision point requires several discrete steps in a general purpose processor. Unlike a general purpose processor, which has the disadvantage that it only has a single memory bus for both instruction and data fetches, the Look-up engine controller has separate buses for instruction and data and typically performs one decision per step. Fast decisions are made possible by a special set of instructions which both conditionally move the pointer and conditionally branch to new code in a single step. The comparisons and pointer movements can be byte or word wide, according to the current field's size.

The look-up engine implements other optimized instructions which perform bit level logical comparisons and conditional branches within the same cycle as well as other instructions tailored to retrieving data from nibble-indexed data structures.

The look-up engine is preferably divided into the following sections:
a) one or more nibble tree address look-up engines (ALE)
b) one microcode engine Each ALE is used to search for addresses in a tree structure in its own large bank of memory. The result of a search is a pointer to pertinent information about the address. An ALE is assigned to destination addresses (DALE) and source addresses (SALE). The ALEs operate independently of each other.

The microcode engine is used to coordinate the search. It invokes the SALE and DALE to search for the source and destination addresses respectively and continues on to parse the remainder of the packet using an application-specific instruction set to determine the protocol.

The SALE, DALE and microcode engine can execute in parallel and arrive at their corresponding results at roughly the same time. The microcode engine then uses the SALE and DALE results along with its own to arrive at the forwarding decision.

The advantage of using RAM over a CAM is expandability and cost. Increasing RAM is a trivial and inexpensive task compared to increasing CAM size.

The advantage of the microcode engine over a general purpose processor is that an ASIC implementation of the function is much less expensive and less complex than a processor-based design with all the overhead (RAM, ROM) associated with it.

The invention also related to a method of parsing packets in a packet-based data transmission network, said packets including packet headers divided into fields having values representing information pertaining to the packet, comprising storing information related to possible values of said fields, receiving fields from said packet headers of incoming packets, and retrieving said stored information appropriate to a received field value, characterized in that said information is stored in a memory organized in a hierarchical tree structure.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

A typical look-up engine (LUE) in accordance with the invention is designed to be used in a twelve-port wire speed Ethernet to ATM bridge-router capable of switching about 178,000 packets per second using 64 byte minimum Ethernet packets. This packet rate corresponds to a look-up request occurring every 5.6 $\mu$secs. The LUE is used each time a packet is received off the Ethernet or the ATM network. The type of information that the engine provides depends on the direction of packet flow and the type of packet.

The look-up engine provides all the information needed to find the path to each known destination, as well as default information in the case of unknown destinations.

Figure 1:
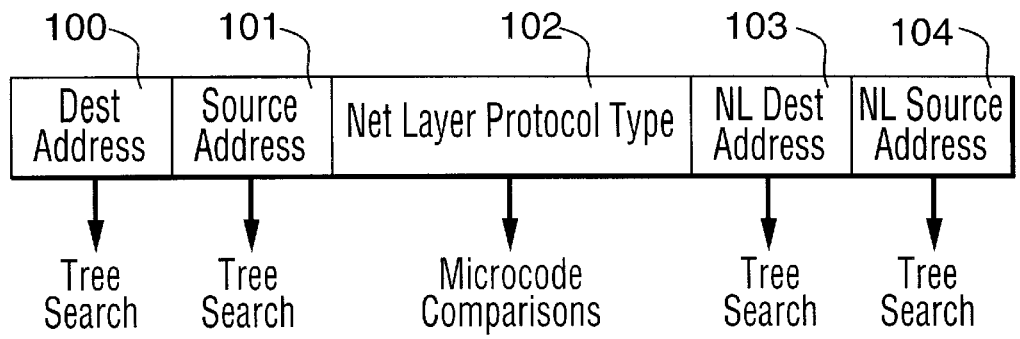
FIG. 1 is an example of a MAC layer header of a typical packet.

FIG. 1 shows a typical MAC layer header format for a packet that can be parsed with the aid of the look-up engine in accordance with the invention. The header comprises destination and source address fields 100, 101, a network layer protocol type field 102, and network layer destination and source address fields 103, 104. FIG. 1 also illustrates how the header is parsed in accordance with the invention. All fields except 102 are parsed using a tree search. The Net Layer Protocol Type field 102 is parsed by using microcode comparisons in the microcode engine to be described.

On a bridge-router, each port is represented by a corresponding bit in a PortSet (Ports 0–11), which is a 16 bit value that has local significance only. The Control Processor and ATM are each assigned a port.

The following definitions are special cases of a PortSet:

SinglePortSet
  a PortSet with a single bit set.
HostPortSet
  a SinglePortSet corresponding to the Control Processor
MyPortSet
  a SinglePortSet corresponding to the source port of this packet.
NullPortSet
  a PortSet of no parts.

A Connection Identifier (CI), which is a 16 bit value with local significance only, is used to map connections into VPI/VCI values.

The following definitions are special cases of CI:

Mesh_CI
  a CI corresponding to a path towards the destination endstation's Bridge-router.

-continued

Null_CI
    a CI connected to nothing. It is returned when the destination is
    attached to the local Bridge-router or if the connection is not
    allowed.
RS_CI
    a CI corresponding to a path to the Route Server.
ABS_CI
    a CI corresponding to a path to the Address/Broadcast Server.

MAC layer addresses are globally unique 48 bit values, except in some protocols such as DECNet, where they may not be globally unique.

Unicast_DA
    a MAC layer destination address of an end-station.
Router_DA
    a MAC layer destination address of the Route Server. An end-
    station sends packets to the Route Server when it cannot send to
    the destination directly at the MAC layer.
Broadcast_DA
    the broadcast MAC layer address (all ones) which is received by
    all end-stations. It cannot be a source address.
Multicast_DA
    a multicast MAC layer address (group bit set) which is received by
    end-stations that recognize that multicast address.

Network layer (NL) addresses are network protocol dependent. They are generally divided into Network, Subnet, and Node portions, although not all protocols have all three present. The Network Layer Address Field Sizes (in bits) are summarized in the table below.

| Protocol | Total Size | Network | Subnet | Node |
|---|---|---|---|---|
| IP | 32 | 8/16/24 | variable | variable |
| IPX | 80 | n/a | 32 | 48 (MAC address) |
| AppleTalk | 24 | n/a | 16 | 8 |
| DECNet | 64 | 16 (reserved) | 38 (32 = 'HIORD') (6 = subnet) | 10 |

The look-up engine handles unicast network layer addresses.

When the look-up engine is used in a bridge-router providing an interface between an Ethernet and ATM network, packets coming from the Ethernet side are fed into the Look-up Engine. The result of the look-up has the form:

Input    ->    Command, CI, PortSet where Input is derived from the first few bytes of the packet and Command is an opcode to the AXE (Transfer engine).

The Quad MAC status word distinguishes between router MAC, broadcast and multicast MACs.

Bridging occurs when the destination address is a unicast address other than the Route Server address. Bridging is allowed between two endstations in the same area for a given protocol.

Both source and destination MAC addresses must be known before automatic bridging/filtering is performed; otherwise, the packet is sent to the Route Server for:

SA (Source Address) validation if the SA has never been seen speaking a given protocol DA (Destination Address) resolution if the DA was not found in the local MAC cache.

The Bridge command instructs the AXE (Transfer Engine) to use RFC-1483 bridge encapsulation. BridgeProp command instructs the AXE to use bridge-router encapsulation (include source PortSet in encapsulation)

Unknown_SA   ->   BridgeProp, Null_CI, HostPortSet, MyPortSet
* Unknown SA - send to HP for Spanning Tree processing
* HP will decide whether to forward it to ABS for learning,
  depending on Spanning Tree state
Unicast_DA   ->   Bridge, Mesh_CI, NullPortSet
* DA in the same area on a different Bridge-router
Unicast_DA   ->   Bridge, Null_CI, NullPortSet
* DA not in the same area (reject)
* Protocol not allowed to bridge-router
* DA on the same port
Unicast_DA   ->   Bridge, Null_CI, SinglePortSet
* DA in the same area on the same Bridge-router but on a different
  port
Unknown_DA   ->   BridgeProp, ABS_CI, NullPortSet, MyPortSet
* DA not found in the table - send to ABS for flood processing
Broadcast_DA   ->   BridgeProp, ABS_CI, NullPortSet, MyPortSet
* Broadcast DA - Send to Control Processor for broadcast
  processing
Multicast_DA   ->   BridgeProp, ABS_CI, NullPortSet, MyPortSet
* Multicast DA - Send to ABS for multicast processing
Multicast_DA   ->   Bridgeprop, Null_CI, HostPortSet, MyPortSet
* Multicast DA is of interest to HP (eg Spanning Tree)
* HP will decide whether to forward it to ABS for multicast
  processing Routing occurs when the destination address is the unicast Route Server address. Filtering rules between areas are explicitly defined per protocol The per protocol source area is an attribute of the source MAC address and the per protocol destination area is an attribute of the destination NL address.

Both source MAC and destination NL addresses must be known before network layer forwarding can occur.

The packet will be bridged to the Route Server if any of the following are true:

IP options are present

Protocol is unknown

The packet will be dropped if any of the following are true:

Source area is not allowed to send to Destination area for this protocol

Source NL address is invalid (e.g. any IP broadcast address)

Checksum is invalid

Time-To-Live field expires

Figure 2:
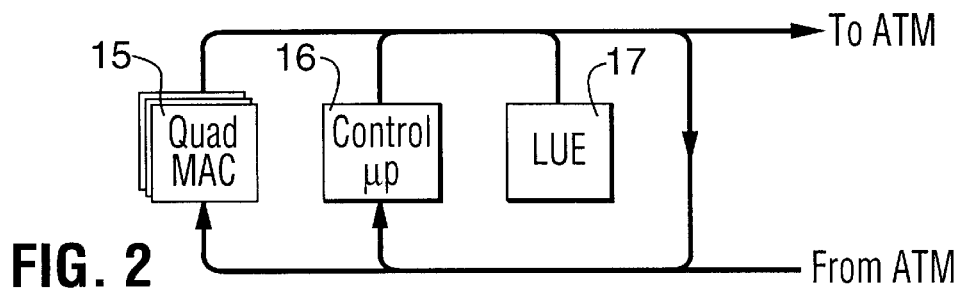
FIG. 2 shows the data paths in a typical bridge-router between Ethernet LAN and ATM networks.

Unicast_NLDA   ->   Route, Mesh_CI, NullPortSet
* NL node on a different bridge-router
Unicast_NLDA   ->   Route, Null_CI, SinglePortSet
* NL node on the same bridge-router (could be same port)
Unknown_NLDA   ->   Bridge, RS_CI, NullPortSet
* unknown NL node - send to Route Server
Unknown_Protocol   ->   Bridge, RS_CI, NullPortSet
* protocol unknown, or packet with options FIG. 2 shows the data paths in a typical bridge-router. Control processor 16 has control over the formatting of packets it sends and receives. If the control processor 16 wants look-up engine 17 to perform a look-up, it formats the packet in the same way as Quad Mac 15; otherwise it sends it as a raw packet, which does not require a lengthy look-up. The control processor predetermines the destination by providing a CI (Connection Identifier) and an output Portset as part of the data stream. A bit in the Quad MAC status word indicates a raw packet and the look-up engine simply retrieves the CI and Portset as part of the data stream. A bit in the Quad MAC status word indicates a raw packet and the look-up engine simply retrieves the CI and Portset from the data stream and feeds it to the AXE (Transfer Engine) through the result FIFO. The Control processor is responsible for correctly formatting the required encapsulation.

As shown in FIG. 2, packets coming from the ATM side are fed into the look-up engine. The look-up engine accepts an RFC-1483 encapsulated packet and determines whether to look at a MAC or NL address. The result of the look-up will have the form:

```
              Input      ->    PortSet
```

Filtering is not performed in this direction. It is assumed that the all filtering is done at the ingress side. It is also assumed that the destination endstation is known to be attached to the receiving Bridge-router, so unicast packets with unknown destination addresses are dropped.

Flood and broadcast packets are encapsulated in a special format which includes an explicit output PortSet.

```
Unicast_DA      ->  SinglePortSet
* DA on this Bridge-router
Unknown_DA      ->  NullPortSet
* DA not in the table (drop) - this situation should not occur.
Unicast_NLDA    ->  SinglePortSet
* NLDA on this Bridge-router
Unknown_NLDA    ->  NullPortSet
* NLDA not in the table (drop) - this situation should not occur.
Broadcast_DA,PortSet  ->  PortSet
* Proprietary Broadcast request received from RS
Multicast_DA,PortSet  ->  PortSet
* Proprietary Multicast request received from RS
Unknown_DA,PortSet    ->  PortSet
* Proprietary Flood request received from RS
```

Figure 3:
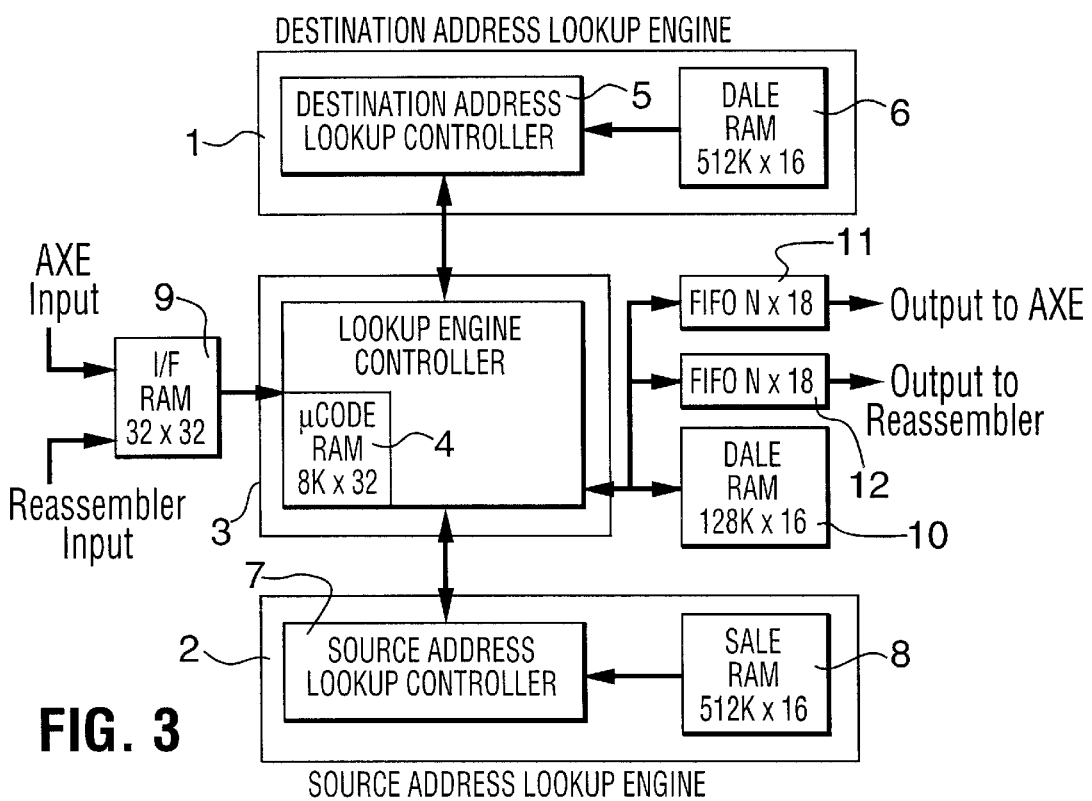
FIG. 3 is a block diagram of a first embodiment of a look-up engine in accordance with the invention.

Turning now to FIG. 3, the look-up engine consists of three functional blocks, namely a destination address look-up engine (DALE) 1, a source address look-up engine (SALE) 2, and a look-up engine controller (LEC) 3, which includes a microcode ram 4. DALE 1 includes a destination address look-up controller 5 and DALE RAM 6. SALE 2 includes a source address look-up controller 7 and SALE RAM 8. The input to the look-up engine is through a fast 16-bit wide I/F RAM 9 receiving input from the AXE (Transfer Engine) and reassembler. The output from the look-up engine is through word-wide FIFOs 11, 12.

Figure 4:
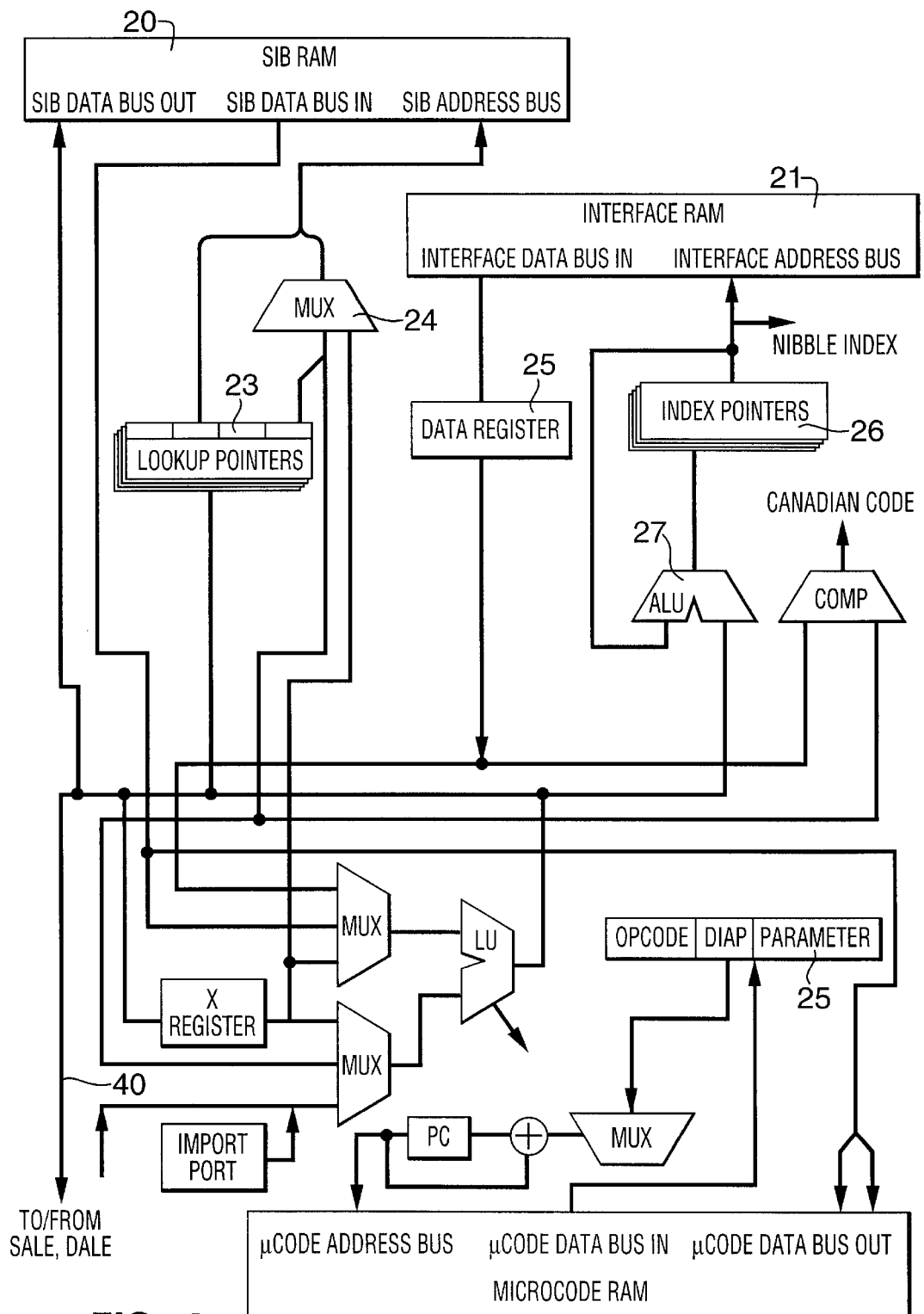
FIG. 4 is a block diagram of a look-up engine controller for the look-up engine shown in FIG. 3.

One embodiment of look-up engine controller (LEC) 3 is shown in more detail in FIG. 4. This comprises (Station Information Block) SIB ram 20, interface ram 21, and microcode ram 22. The SIB ram 20 is connected to look-up pointers 23. Interface ram 21 is connected to data register 25 and index pointers 26 connected to ALU (Arithmetic Logic Unit) 27. Microcode ram 22 is connected to instruction register 28.

The look-up Engine controller 3 is a microcoded engine tailored for efficient bit pattern comparisons through a packet. It communicates with the Source Address Look-up Engine 2 and the Destination Address Look-up Engine 1, which both act as co-processors to the LEC 3.

The look-up engine snoops on the receive and transmit data buses and deposits the header portion of the packet into the I/F RAM 9. The look-up response is sent to the appropriate FIFO 11, 12.

Figure 5:
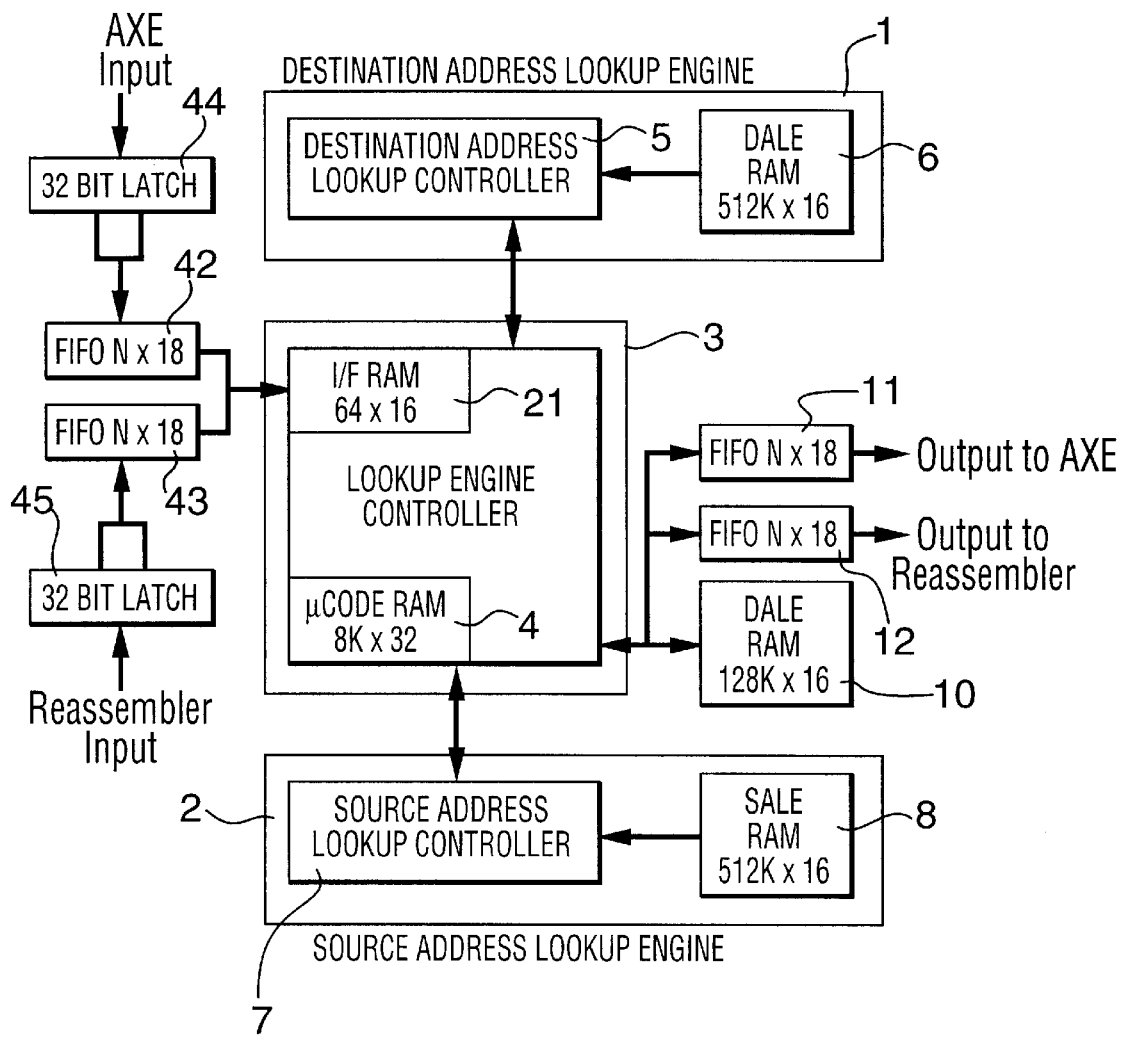
FIG. 5 is a block diagram of a second embodiment of a look-up engine in accordance with the invention.

FIGS. 5 show an alternative embodiment of the loop-up engine and controller. In FIG. 5, the LEC 3 includes a 64×16 I/F (Interface) ram 41 connected to FIFO's 42, 43 (First-in, First-out memories) respectively connected to latches 44, 45 receiving AXE (Transfer Engine) and reassembler input.

Figure 6:
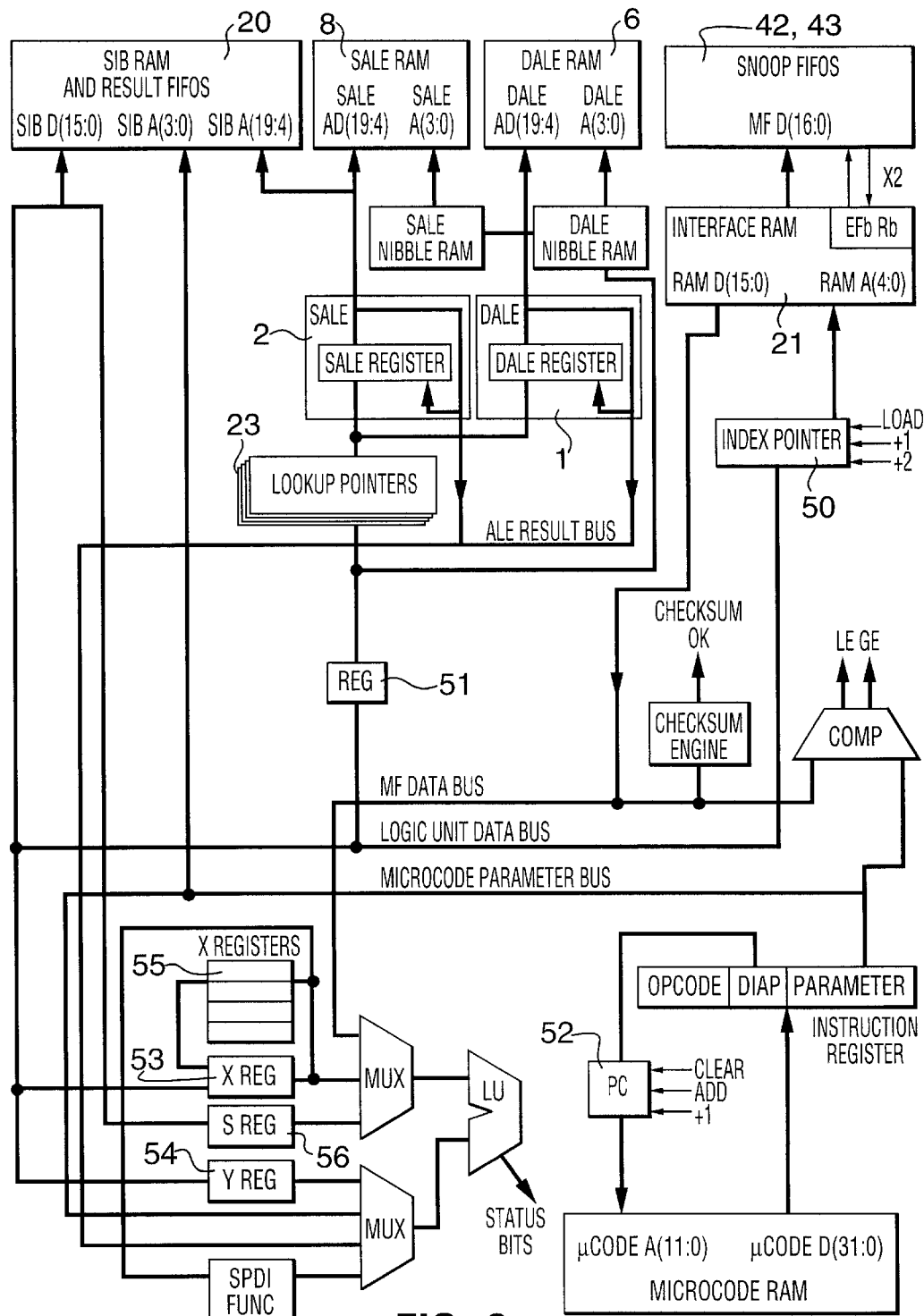
FIG. 6 is a block diagram of a look-up engine controller for the look-up engine shown in FIG. 5.

Referring now to FIG. 6, the LEC 3 also contains several registers, which will now be described. Register select instructions are provided for the register banks (XP0–7, LP0–7).

Index Pointer register (IP) 50 is a byte index into the I/F RAM 21. Under normal operation, the index pointer register 50 points to the current packet field being examined in the I/F RAM 21 but it can be used whenever random access to the I/F RAM 21 is required.

The IP 50 can be modified in one of the following ways:
1) loaded by the LOADIP instruction (e.g. to point to the beginning of the packet)
2) incremented by 1 (byte compare) or 2 (word compare) if a branch condition is not met.
3) incremented by 2 by a MOVE (IP)+ type instruction.

Data Register 51 contains the 16 bit value read from I/F RAM 21 using the current IP. The DR 51 acts like a one word cache; the LEC keeps its contents valid at all times.

Program Counter 52 points to the current microcode instruction. It is incremented by one if a branch condition is true, otherwise the displacement field is added to it.

The Lookup Pointers (LP0–7) 23 are 16 bit registers which contain pointers to the SIB RAM 20. The LPs are used to store pointers whenever milestones are reached in a search. One LP will typically point to a source SIB and another will point to a destination SIB. The LP provides the upper 16 bits of the pointer; the lower 4 bits are provided by the microcode word for indexing into a given SIB.

The LPs are also used to prime the SALE and DALE with their respective root pointers.

X,Y Registers 53, 54 are general purpose registers where logic manipulations can be made (AND, OR, XOR). They are used for setting and clearing bits in certain words in the SIB RAM (e.g. Age bit) and to test for certain bits (e.g. status bits). The X Register 53 can be selected as Operand A to the Logic Unit while the Y Register can be selected as Operand B.

The BYZ and BYNZ instructions conditionally branch on Y=0 and Y<>0 respectively.

The Y Register 54 is the only register source for moves to the result FIFOs.

The X Register 53 can be saved to or restored from X' Registers (X'0–X'7) 55. The mnemonic symbol for the currently selected X' register is XP.

The S Register 56 is a pipelining stage between SIB RAM 20 and the Logic Unit. It simplifies read access from SIB RAM 20 by relaxing propagation delay requirements from SIB RAM 20 valid to register setup. It provides the added advantage of essentially caching the most recent SIB RAM access for repeated use. It is loaded by the GET Index(LP) instruction.

As in FIG. 3, the LEC 3 controls the operation of the look-up engine. All look-up requests pass through the LEC 3, which in turn activates the SALE 2 and the DALE 5 as required. The LEC 3 is microcode based, running from a 32-bit wide microcode RAM. The instruction set consists mainly of compare-and-branch instructions, which can be used to find specific bit patterns or to check for valid ranges in packet fields. Special I/O instructions give the LEC random read access to the interface RAM.

The LEC has access to 3 memory systems: the interface RAM 9, the SIB RAM 20 and the Microcode RAM 22.

The interface RAM 9 is used to feed packet data into the LEC 3. The look-up engine hosts dump packet headers into this RAM through snoop FIFOs 42, 43. This RAM is only accessible through the snooped buses.

The SIB RAM 20 is used to hold information for each known end-station. The LEC 3 can arbitrarily retrieve data from this RAM and transfer it to one of the response FIFOs 11, 12 or to internal registers for manipulation and checking. High speed RAM is also used to minimize the data retrieval time. The size of the SIB RAM 20 is dependent on the maximum number of reachable end-stations. For a limit of 8,000 end-stations, the SIB RAM size is 256K bytes. This RAM is accessible directly to the Control Processor for updates.

The Microcode RAM 22 is dedicated to the LEC 3. It contains the 32 bit microcode instructions. The LEC 3 has read-only access to this high speed RAM normally, but it is mapped directly to the Control Processor's memory space at startup for microcode downloading.

Figure 7:
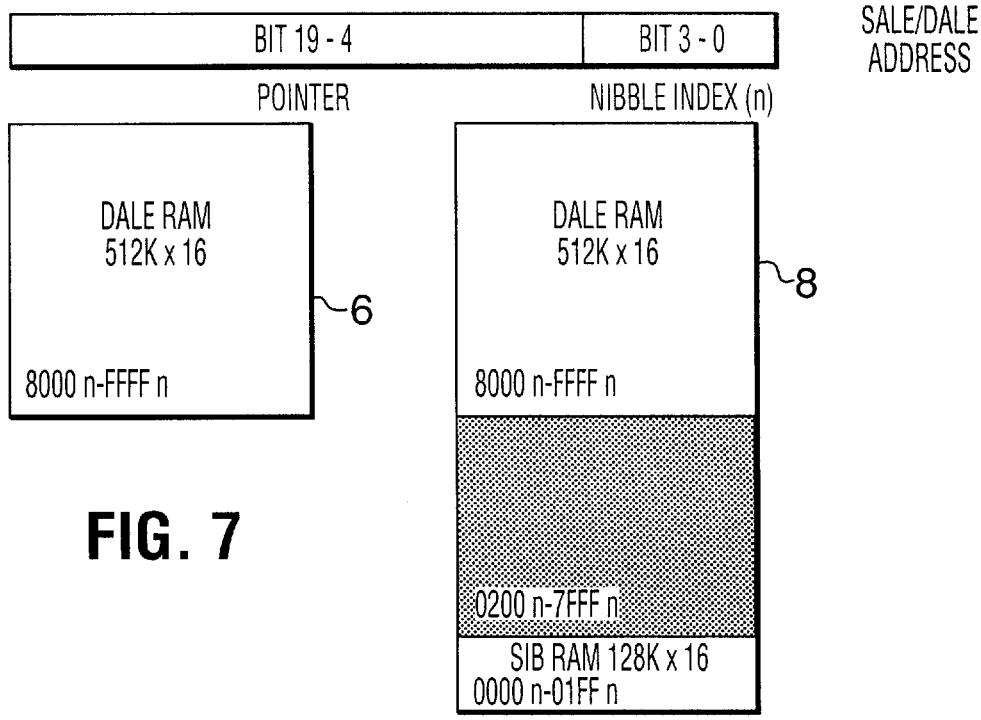
FIG. 7 is a map of look-up engine Address Look-up engine (ALE) memories.

Variable fields of a packet, such as addresses, are searched in one of many search trees in the ALEs 1, 2, (FIG. 5), which are nibble index machines. Each ALE 1, 2 has its own search tree RAM 6, 8 (FIG. 7), which is typically high density but low speed. This RAM is divided into 32 byte blocks which can either be Index Arrays or Information Blocks.

The searches in the ALEs 1, 2 are based strictly on the root pointer, the search key and search key length it is given. A look at the look-up engine memory map (FIG. 7) as viewed from the ALEs shows how the mechanism works.

Figure 8:
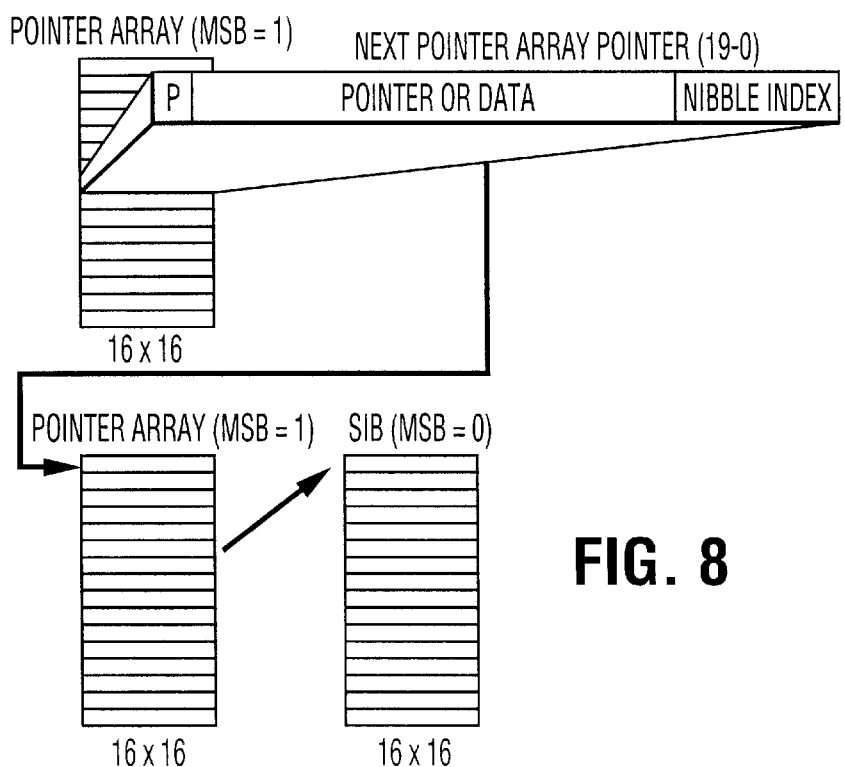
FIG. 8 is a diagram illustrating search tree operation in an ALE.

All search trees in a given ALE 6, 8 reside in the upper half of its memory. The 16-bit root pointer given to the ALE will have the most significant bit set. The search key (e.g. MAC address) is divided into nibbles. The first nibble is concatenated with the root pointer to get an index into the root pointer array. The word at this location is retrieved. If the MSB (Most Significant Bit) (P Bit) is set, the next nibble is concatenated with the retrieved word to form the next pointer. If the P Bit is clear, the search is finished. The final result is given to the LEC, which uses it either as a pointer into the SIB RAM, or as data, depending on the context of the search. A zero value is reserved as a null pointer value. FIG. 8 illustrates search tree operation.

The search key length limits the number of iterations to a known maximum. The control processor manipulating the search tree structure may choose to shorten the search by putting data with a zero P bit at any point in the tree.

"Don't Care" fields are also achievable by duplicating appropriate pointers within the same pointer array. Search trees are maintained by the Control Processor, which has direct access to the SALE and DALE RAMs 6, 8.

Figure 9:
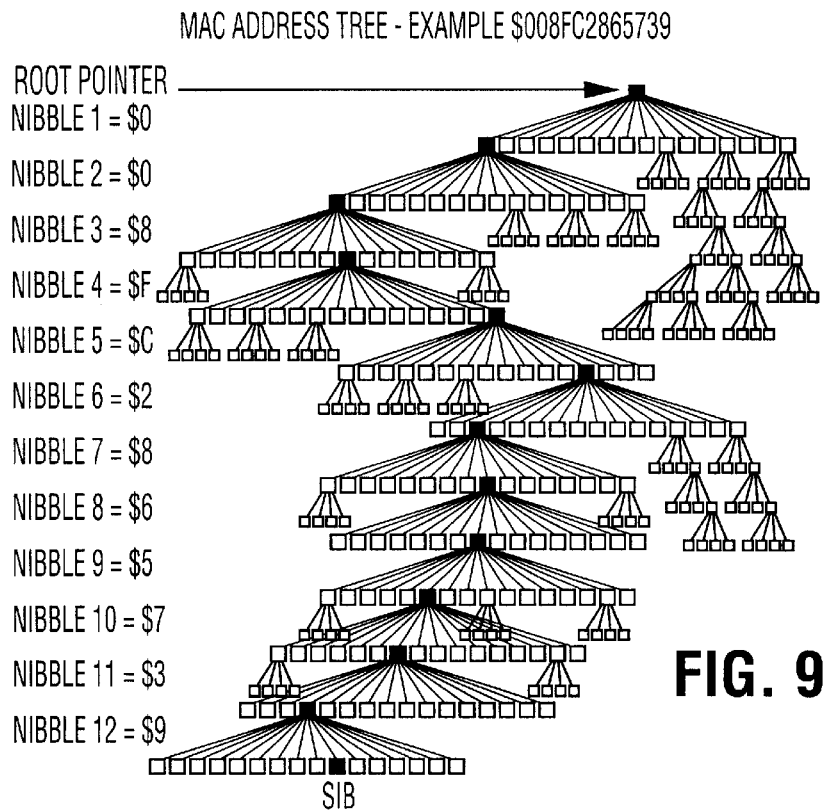
FIG. 9 shows one example of a MAC search tree.

FIG. 9 is a diagram illustrating a MAC search tree example. The main purpose of the ALE RAMs 6, 8 is to hold MAC layer addresses. The size of the RAM required for a MAC address tree depends on the statistical distribution of the addresses. The absolute worst case is given by the following formula:

$$N = \sum_{i=1}^{L} \min(16^{i-1}, X)$$

where

X is the number of addresses

L is the number of nibbles in the address

N is the number of pointer arrays

The amount of memory required, given 32-byte pointer arrays, is 32N. The number obtained from this formula can be quite huge, especially for MAC addresses, but some rationalizations can be made.

In the case of MAC addresses, the first 6 nibbles of the address is the Organizationally Unique Identifier (OUI), which is common to Ethernet cards from the same manufacturer. It can be assumed that a particular system will only have a small number of different OUIs.

The formula for MACs then becomes:

$$N = \sum_{i=1}^{6} \min(16^{i-1}, M) + \sum_{j=1}^{M}\sum_{i=7}^{12} \min(16^{i-7}, X_j)$$

where

M is the number of different OUIs $X_j$ is the number of stations in $OUI_j$

Assuming that the addresses are distributed evenly over all OUIs, $$N = \sum_{i=1}^{6} \min(16^{i-1}, M) + M\sum_{i=7}^{12} \min(16^{i-7}, \frac{X}{M})$$

Figure 10:
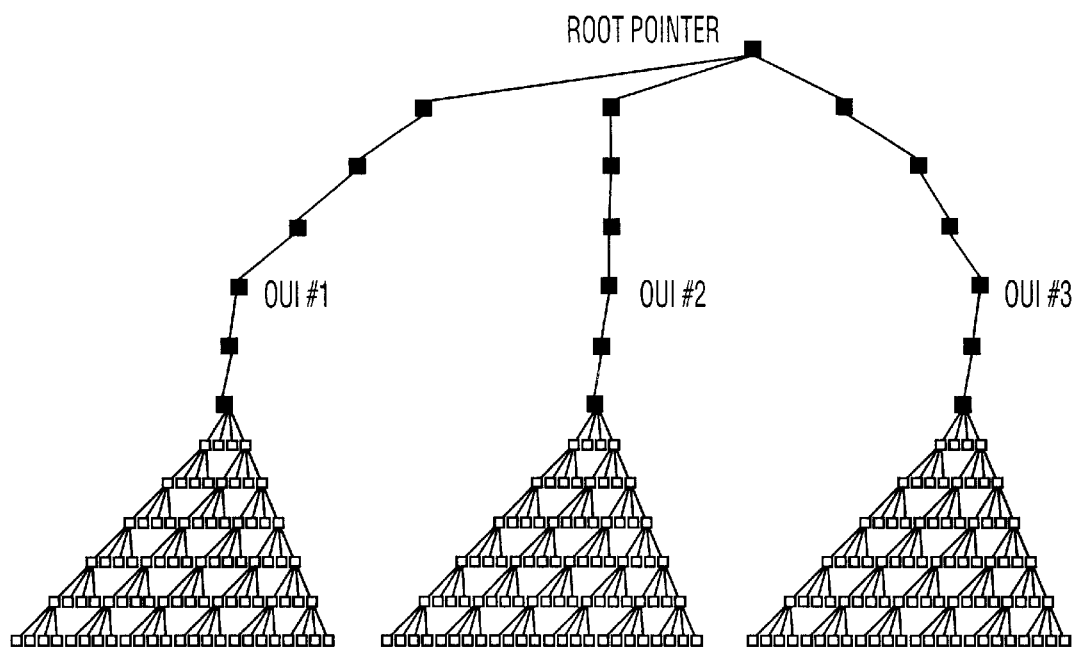
FIG. 10 shows the effect of the organizationally unique identifier of the MAC addresses on the size of the search tree.

The effect of OUI on Search Tree Size is shown in FIG. 10.

Similar rationalizations can be made with IP and other network layer protocol addresses. An IP network will not have very many subnets and even fewer network numbers.

Although the SALE 2 typically holds locally attached source MAC addresses and the DALE 1 typically holds destination MAC addresses, either ALE 1, 2 is capable of holding any arbitrary search tree. Network layer addresses, intra-area filters, and user-defined MAC protocol types can all be stored in search trees. The decision to put a search tree in either SALE or DALE is implementation dependent; it relies on what searches can be done in parallel for maximum speed.

The principal function of the SALE 2 is to keep track of the MAC addresses of all stations that are locally attached to the bridge-router. Typically one station will be attached to a bridge-router port, but connections to traditional hubs, repeaters and bridge-routers are allowed, so more source addresses will be encountered.

Using the formula for RAM size above, typical RAM calculations for the source address trees are as follows:

| Number of OUIs | Number of Stations | Total Bytes |
|---|---|---|
| 20 | 400 | 65,440 |
| 2 | 500 | 65,184 |
| 20 | 500 | 77,984 |
| 20 | 800 | 116,284 |
| 5 | 1,000 | 131,552 |

The number of source stations is limited to some fraction of the total allowable stations. The limit is imposed here because the SALE will most likely hold many of the other search trees (e.g. per protocol NL address search trees, intra-area filters).

Whenever a new source address is encountered, the SALE 1 will not find it in the MAC source address search tree. The LEC 3 realizes the fact and sends it to the Control Processor. The new source address is inserted into the search tree once validation is received from the Route Server.

Whenever a previously learned address is re-encountered, the Age entry in the SIB 20 is refreshed by the LEC 3. The control processor clears the Age entry of all source addresses every aging period. The entry is removed when the age limit is exceeded.

Figure 11:
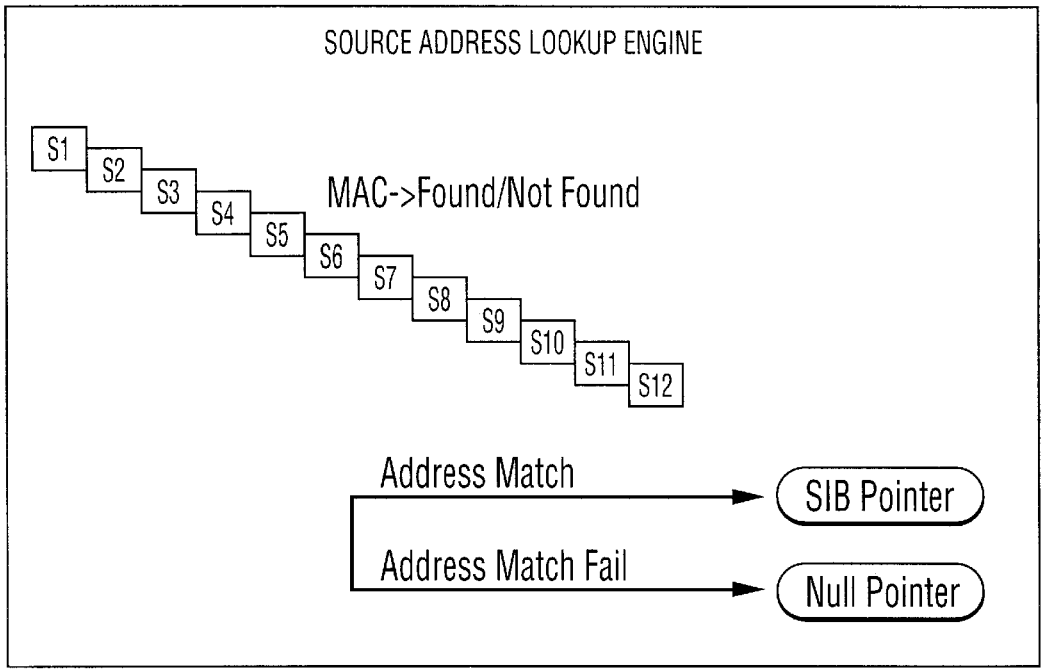
FIG. 11 shows the source address look-up engine table.

The source address look-up engine table is shown in FIG. 11.

The DALE 1 keeps track of all stations that are directly reachable from the bridge-router, including those that are locally attached. The DALE search trees are considerably larger because they contain MAC addresses of up to 8,000 stations.

Typical memory sizes for MAC destination address search trees would be:

| Number of OUIs | Number of Stations | Total Bytes |
|---|---|---|
| 10 | 8,000 | 856,992 |
| 20 | 8,000 | 945,824 |
| 30 | 8,000 | 1,034,464 |

A station's MAC address will appear in the MAC search tree if the station is reachable through MAC bridging. A station's network layer address will appear in the corresponding network layer search tree if it is reachable through routing.

Figure 12:
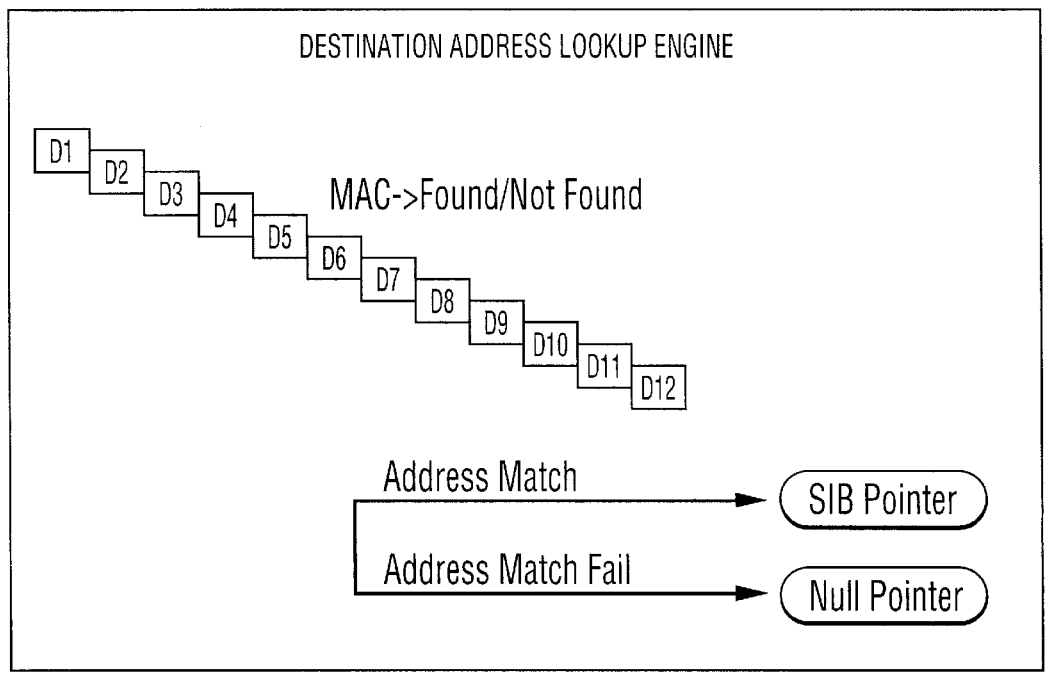
FIG. 12 shows the destination address look-up table.

The destination address look-up engine MAC table is shown in FIG. 12.

IP masking may be required if a particular port is known to have a router attached to it. Masking is achieved by configuring the IP network layer search tree in such a way that the node portion of the address is treated as Don't Care bits and the corresponding pointers point to the same Next Index Array.

The SALE and DALE RAMs 8, 6 are divided up into 16 word blocks. These RAMs are accessible only to the corresponding ALE and the Control Processor. These RAMs contain mostly pointer arrays organized in several search trees.

The SIB RAM 20 is divided into 16 word blocks which can be treated as records with 16 fields. Each block typically contains information about an endstation. This RAM is accessible only to the LEC and the CP.

The LEC 3 uses the lookup pointer (LP) as a base pointer into a SIB 20. The contents of the LP is obtained either from the result of a SALE 2 or DALE 1 search to access end-station information, or from a constant loaded in by the microcode to access miscellaneous information (e.g. port information). The LP provides the upper sixteen bits and the microcode word provides the lowest four bits of the SIB RAM address.

Figure 13:
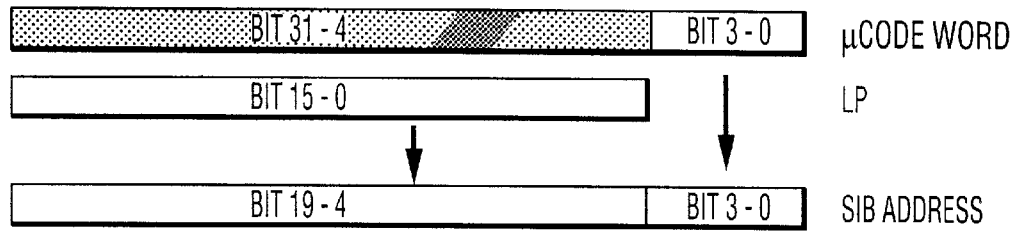
FIG. 13 illustrates the look-up engine addressing modes.

The lookup Engine addressing scheme is shown in FIG. 13.

The SIB RAM 20 (FIG. 14) generally contains information about the location of an endstation and how to reach it. For example, the PortSet field may keep track of the port that the endstation is attached to (if it is locally attached) and the connection index refers to a VPI/VCI pipe to the endstation (if it is remotely attached). Other fields are freely definable for other things such as protocol filters, source and destination encapsulation types and quality-of-service parameters, as the need arises.

Figure 15:
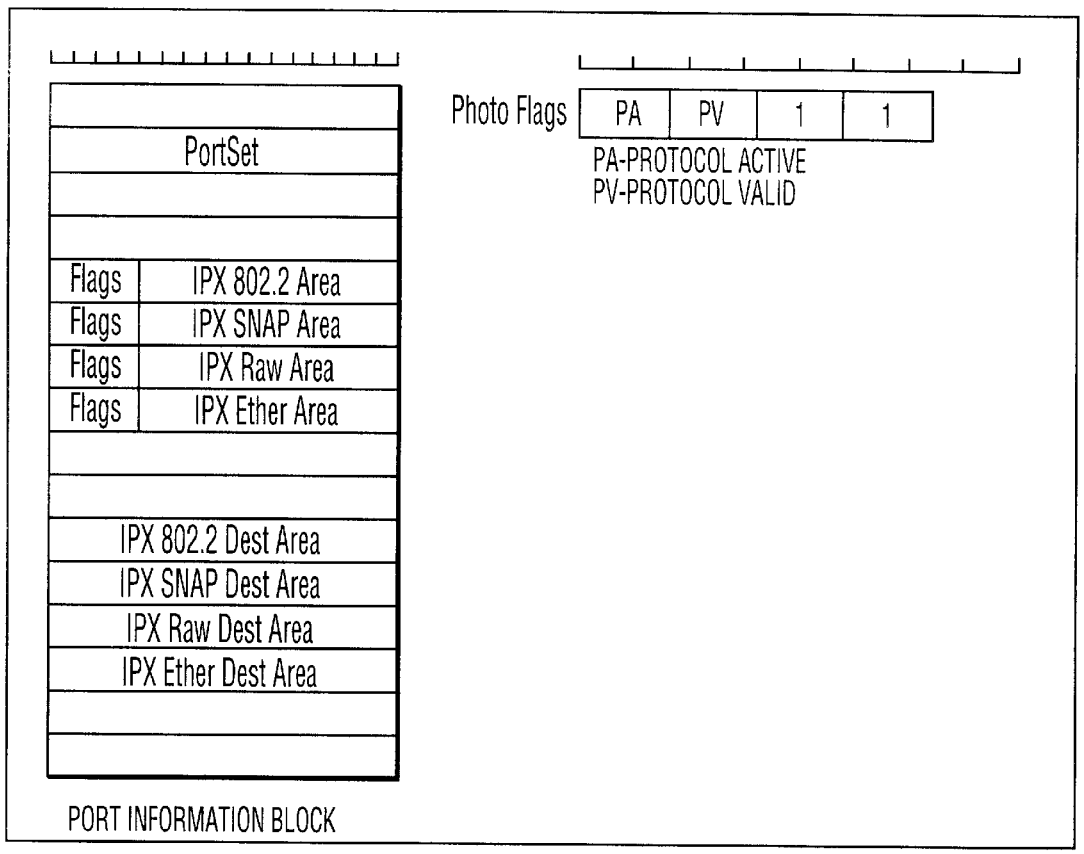
FIG. 15 shows a port information block.

A variant of the SIB is the Port Information Block (PIB) (FIG. 15). PIBs contain information about a particular port. Certain protocols have attributes attached to the port itself, rather than the endstations. An endstation inherits the characteristics assigned to the port to which it is attached.

The definition of the SIB is flexible; the only requirement is that the data be easily digestible by the LUE instruction set. The field type can be a single bit, a nibble, a byte, or a whole word.

Figure 14:
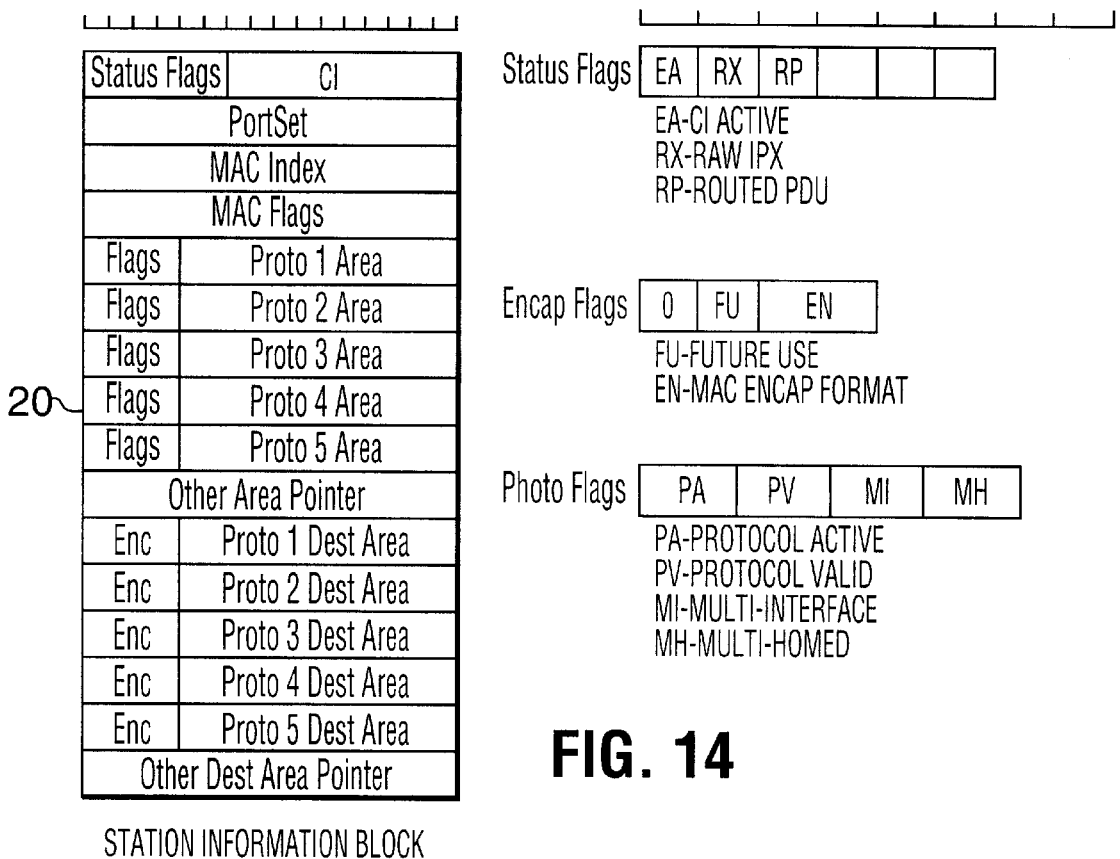
FIG. 14 shows a station information block.

In FIG. 14, the CI (Connection Identifier) field is a reference to an ATM connection to the endstation if it is remotely attached. This field is zero for a locally attached endstation.

The PortSet field is used both for determining the destination port of a locally attached endstation, and for determining whether a source endstation has moved. In one Newbridge-router Networks system, a moved endstation must go through a readmission procedure to preserve the integrity of the network. This field is zero for a remotely attached endstation.

The MAC Index is a reference to the 6-byte MAC layer address of the endstation. This field is used for network layer forwarded packets, which have the MAC layer encapsulation removed. The MAC layer address is re-attached when a packet is re-encapsulated before retransmission out an Ethernet port. The encapsulation flags determine the MAC re-encapsulation format.

The Proto Area and Proto Dest Area fields are used for filtering operations. Because the Newbridge-router system essentially removes the traditional physical constraints on a network topology, the area concept logically re-imposes the constraints to allow existing protocols to function properly. Filtering rules defined between areas determine whether two endstations are logically allowed to communicate with each other using a specific protocol.

The Proto Area field is a pointer to a filtering rule tree, which is similar in structure to the address trees. The Dest Area field is a search key into the tree. The result of the search is a bitfield in which each protocol is assigned one bit. Communications is allowed if the corresponding bit is set.

Figure 16:
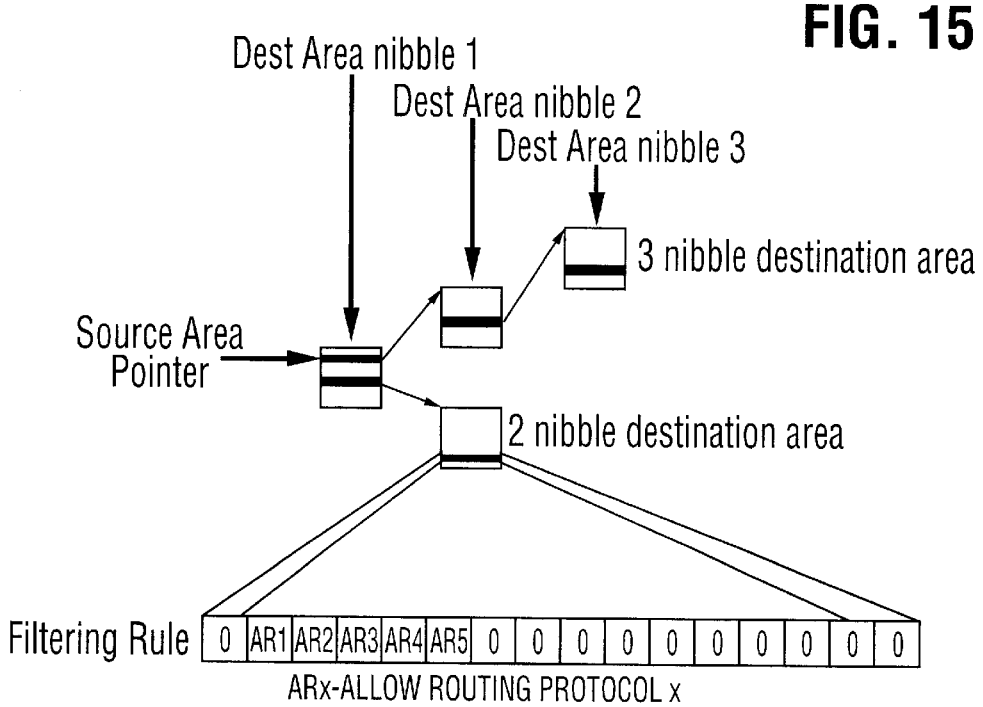
FIG. 16 shows an example of protocol filtering.

FIG. 16 shows a filtering rule tree.

The microcode for the LEC 3 will now be described. The LEC microcode is divided into four main fields as shown in the table below. The usage of each field is dependent on the instruction group.

| 31–29 | 28–24 | 23–16 | 15–0 |
|---|---|---|---|
| Inst Group | Instruction | Displacement | Parameter |

The instruction group field consists of instructions grouped according to similarity of function. A maximum of eight instruction groups can be defined.

The Instruction field definition is dependent on Instruction Group.

In branch instructions, the Displacement field is added to the PC if the branch condition is true. This field is used by non-branch instructions for other purposes.

The Parameter field is a 16 bit value used for comparison, as an operand, or as an index, dependent on the instruction.=

The functions of the groups are set out in the following table.

| | |
|---|---|
| Group 0 | Index Pointer/Bank Select Instructions<br>These instructions manipulate the IP and the register bank select register. |
| Group 1 | Fast Move Instructions<br>These instructions move data between I/F RAM and internal registers. |
| Group 2 | Conditional Branch Instructions<br>These instructions branch when a given condition is met. They can optionally increment the IP. |
| Group 3 | X Register Branch Instructions<br>These instructions branch on an X Register logic comparison. |
| Group 4 | Not Used |
| Group 5 | Slow Move Instructions<br>These instructions generally involve the SIB RAM bus. The access time to the SIB RAM is longer because of address setup time considerations and because the CP may be accessing it at the same time. Access to the Result FIFOs are included here. |
| Group 6 | Not Used |
| Group 7 | Misc Instructions<br>These instructions invoke special functions. |

The following table describes the use of each of the fields.

| Grp | 31–29 | 28–26 | 25–24 | 23–21 | 20–18 | 17–16 18–16* | 15–0 |
|---|---|---|---|---|---|---|---|
| 0 | 0 0 0 | 0 0 0 | Oper. | 1 1 1 | 1 1 0 | BSel | Immediate Value (15–0) or Register Select (15–4) |
| 1 | 0 0 1 | Dest. | Size | LSel | ASel | BSel | Immediate Value (15–0) Register Select (15–4) or Index (3—0) |
| 2 | 0 1 0 | Cond. | Size | | Disp. (8) | | Comparand |
| 3 | 0 1 1 | Cond. | 0 0 | LSel | Disp. (5) | | Comparand |
| 4 | 1 0 0 | | | | | | |
| 5 | 1 0 1 | Dest. | Size | LSel | ASel | BSel | Immediate Value (15–0) Register Select (15–4) or Index (3—0) |
| 6 | 1 1 0 | | | | | | |
| 7 | 1 1 1 | 0 0 0 | Size | 0 0 0 | 0 0 0 | 0 0 | codes |

*when LSel = 110

Condition
000 - (IP) = Comparand
001 - (IP) < Comparand
010 - (IP) > Comparand
011 - True
100 - Extended Condition = True
101 - Extended Condition = False
110 - Y = 0
111 - Y <> 0
Dest - Destination
000 - currently active FIFO
001 - X Register
010 - Lookup Engine Address RAM
011 - Group 5: S Register
    otherwise: None
100 - Y Register
101 - Index (LP) (SIB RAM)
110 - XP Register
111 - Lookup Pointer
Operation - IP/Register Select operation
00 - Register Select
10 - Load
Size - IP increment size
00 - no increment
01 - byte (+1)
10 - word (+2)
Displacement (8 bits)
00000001 - next instruction
00000000 - same instruction
Displacement (5 bits)
00001 - next instruction
00000 - same ihstruction
LSel - Logic Unit Select
000 - A AND B
001 - A OR B
010 - A AND NOT B
011 - A OR NOT B
100 - A XOR B
101 - Reserved
010 - B
111 - A
ASel - Operand A Select
000 - (IP), (IP)+    Indirect I/F Data
001 - X    X Register
010 - S    S Register
011 - XP    X' Register
100 - XP    X' Register
101 -
110 -
111 -
BSel - Operand B Select
00 - Y    Y Register
01 - #Value    Immediate Value
11 -    Special Function
When LSel = 110:

Condition

010 - DALE Lookup Result
110 - SALE Lookup Result
Immediate Value
Word values fill the whole field
Byte values must be repeated twice to fill the field
When BSel = 11 (Special Functions):

| Value | Function | Mnemonic |
|---|---|---|
| $0000 | X rotate left 4 | L4(X),R12(X) |
| $1000 | X rotate 8 (byte swap) | SWAP(X),L8(X),R8(X) |
| $2000 | X rotate right 4 | R4(X),L12(X) |
| $3000 | portset(X) | PSET(X) |
| $4000 | X rotate left 1 | L1(X) |
| $5000 | X rotate right,1 | R1(X) |
| $6000 | flip X | FLIP(X) |
| $7000 | LUE Version number | VER |

When Value = $3000 (Portset Function):

| X(11:8) | f(15:0) |
|---|---|
| 0 | 0000000000000001 |
| 1 | 0000000000000010 |
| 2 | 0000000000000100 |
| 3 | 0000000000001000 |
| 4 | 0000000000010000 |
| 5 | 0000000000100000 |
| 6 | 0000000001000000 |
| 7 | 0000000010000000 |
| 8 | 0000000100000000 |
| 9 | 0000001000000000 |
| 10 | 0000010000000000 |
| 11 | 0000100000000000 |
| 12 | 0001000000000000 |
| 13 | 0010000000000000 |
| 14 | 0100000000000000 |
| 15 | 1000000000000000 |

FIFO Write Instructions

| 31–29 | 28–26 | 25–24 | 23–21 | 20–18 | 17–16 | 15–0 |
|---|---|---|---|---|---|---|
| 1 0 1 | 0 0 0 | 0 0 | 1 1 0 | Extra | BSel | Immediate Value (15–0) |

| | |
|---|---|
| 0ee 01 | MOVEF #Value,Extra |
| | Move Immediate Value to FIFO with Extra bits |
| 0ee 00 | MOVEF Y,Extra |
| | Move Y Register to FIFO with Extra bits |
| 1ee 00 | MOVEF Index(LP),Extra |
| | Move Indexed Lookup Data to FIFO with Extra bits |

The FIFO write instructions are used to write data into the currently active result FIFO. The Extra field control bits 16 and 17 in the FIFO data bus.

The third instruction in the list is a direct memory access from SIB RAM to the active FIFO. SIB RAM is enabled while the active FIFO is sent a write pulse. Doing so avoids having SIB data propagate through the LUE. Bit 20 differentiates between a DMA and a non-DMA instruction.

The X register cannot be used as a MOVEF source because what would normally be the ASel field conflicts with the Extra field.

Usage:

| | | | |
|---|---|---|---|
| MOVEF | #IPSnap,0 | ; Packet is IP over SNAP | |

Interface RAM Data Read Instructions

| 31–29 | 28–26 | 25–24 | 23–21 | 20–18 | 17–16 | 15–0 |
|---|---|---|---|---|---|---|
| 0 0 1 | Dest | Size | 1 1 1 | 0 0 0 | 0 0 | Unused |

| Dest/Size | | |
|---|---|---|
| 001 00 | MOVE | (IP),X |
| | Move IP indirect to X Register | |
| 001 10 | MOVE | (IP)+,X |
| | Move Ip indirect autoinc to X Register | |
| 100 00 | MOVE | (IP),Y |
| | Move IP indirect to Y Register | |
| 100 10 | MOVE | (IP)+,Y |
| | Move IP indirect autoinc to Y Register | |
| 111 00 | MOVE | (IP),LP |
| | Move IP indirect to LP Register | |
| 111 10 | MOVE | (IP)+,LP |
| | Move IP indirect autoinc to LP Register | |

Interface RAM Data Read instructions are used to read data from the Interface RAM 41 into the X, Y or LP Register. The LP used is preselected using the RSEL instruction.

Lookup Pointer Instructions

| 31–29 | 28–26 | 25–24 | 23–21 | 20–18 | 17–16 | 15–0 |
|---|---|---|---|---|---|---|
| Group | Dest | 0 0 | LSel | ASel or Extra | BSel | Immediate Value (15–0) Reg Sel (15–4) or Index (3–0) |

| Group/Dest/LSel/ASel/BSel - Instruction Type | | |
|---|---|---|
| 101 101 111 001 00 | MOVE | X,Index(LP) |
| | Move X Register to Indexed Lookup Data | |

-continued

| Group/Dest/LSel/ASel/BSel - Instruction Type | | |
|---|---|---|
| 101 101 110 000 00 | MOVE | Y,Index(LP) |
| | Move X Register to Indexed Lookup Data | |
| 101 011 000 000 00 | GET | Index(LP) |
| | Load S Register with Indexed Lookup Data | |
| 001 111 110 000 00 | MOVE | Y,LP |
| | Move X Register to Lookup Pointer | |
| 001 111 110 000 01 | MOVE | #Value,LP |
| | Move Immediate Value to Lookup Pointer | |
| 001 111 111 001 00 | MOVE | X,LP |
| | Move X Register to Lookup Pointer | |

Lookup Pointer instructions are used to load the Lookup Pointers or to store and retrieve values in Lookup RAM.

Usage:

| | | |
|---|---|---|
| MOVE | Age(LP),X | ; Get Age field |
| . . . | | ; check age |
| . . . | | ; reset age |
| MOVE | X,Age(LP) | ; put it back in |

Logic Instructions

| 31–29 | 28–26 | 25–24 | 23–21 | 20–18 | 17–16 | 15–0 |
|---|---|---|---|---|---|---|
| 0 0 1 | Dest | 0 0 | LSel | ASel | BSel | Immediate Value (15–0) or Index (3–0) |

Logic instructions are used to perform logic manipulations on the X and Y Registers. Combinations of the selections above yield the following (useful) instructions:

| Dest/LSel/ASel/BSel | | |
|---|---|---|
| 001 110 000 00 | MOVE | Y,X |
| | Y -> X | |
| 100 111 001 00 | MOVE | X,Y |
| | X -> Y | |
| 001 111 010 00 | MOVE | S,X |
| | S -> X | |
| 100 111 010 00 | MOVE | S,Y |
| | S -> Y | |
| 001 110 000 01 | MOVE | #Value,X |
| | Immediate Value -> X | |
| 100 110 000 01 | MOVE | #Value,Y |
| | Immediate Value -> Y | |
| 001 000 001 00 | AND | X,Y,X |
| | X AND Y -> X | |
| 001 000 010 00 | AND | S,Y,X |
| | S AND Y -> X | |
| 001 000 001 01 | AND | X,#Value,X |
| | X AND Value -> X | |
| 001 000 010 01 | AND | S,#Value,X |
| | S AND Value -> X | |
| 100 000 001 00 | AND | X,Y,Y |
| | X AND Y -> Y | |

Dest/LSel/ASel/BSel

| | |
|---|---|
| 100 000 010 00 | AND S,Y,Y |
| | S AND Y -> Y |
| 100 000 001 01 | AND X,#Value,Y |
| | X AND Value -> Y |
| 100 000 010 01 | AND S,#Value,Y |
| | S AND Value -> Y |
| OR, ANDN, ORN and XOR are similar to AND: | |
| dst 001 aaa bb | OR aaa,bb,dst |
| | aaa OR bb -> dst |
| dst 010 aaa bb | ANDN aaa,bb,dst |
| | aaa OR bb -> dst |
| dst 011 aaa bb | ORN aaa,bb,dst |
| | aaa OR bb -> dst |
| dst 100 aaa bb | XOR aaa,bb,dst |
| | aaa OR bb-> dst |

Conditional Branch Instructions

| 31–29 | 28–26 | 25–24 | 23–16 | 15–0 |
|---|---|---|---|---|
| 0 1 0 | Cond. | Size | Displacement | Comparand |

| Cond/Size | | |
|---|---|---|
| 000 01 | ESCNE.b | #Comparand,Label |
| | Escape if Byte Not Equal | |
| 000 10 | ESCNE.w | #Comparand,Label |
| | Escape if Word Not Equal | |
| 001 01 | ESCGE.b | #Comparand,Label |
| | Escape if Byte Greater or Equal | |
| 001 10 | ESCGE.w | #Comparand,Label |
| | Escape if Word Greater or Equal | |
| 010 01 | ESCLE.b | #Comparand,Label |
| | Escape if Byte Less or Equal | |
| 010 10 | ESCLE.w | #Comparand,Label |
| | Escape if Word Less or Equal | |
| 110 00 | BYZ Label | |
| | Branch if Y Register is zero | |
| 111 00 | BYNZ Label | |
| | Branch if Y Register is not zero | |

Increment Branch instructions are used to compare the current packet field with an immediate value. If the condition is met, the branch is taken; otherwise IP is incremented by the Increment Size.

Usage:

```
Label1:                                 ; check if SNAP header
    ESCNE. w    #$AAAA,Label2           ; compare to SNAP value
    ESCNE.w     #$0003,OtherLabel
    . . .
Label2:
```

X Register Branch Instructions

| 31–29 | 28–26 | 25–24 | 23–21 | 20–16 | 15–0 |
|---|---|---|---|---|---|
| 0 1 1 | Cond | 0 0 | LSel | Disp | Value |

| Cond/LSel | | |
|---|---|---|
| 110 100 | BXEQ | #Value,Label |
| | Branch if X is equal to value | |
| 111 100 | BXNE | #Value,Label |
| | Branch if X is not equal to value | |
| 110 000 | ANDBZ | #Value,Label |
| | Branch if X AND Value is equal to zero | |
| 111 000 | ANDBNZ | #Value,Label |
| | Branch if X AND Value is not equal to zero | |
| 110 010 | ANDNBZ | #Value,Label |
| | Branch if X AND NOT Value is equal to zero | |
| 111 010 | ANDNBNZ | #Value,Label |
| | Branch if X AND NOT Value is not equal to zero | |

X Register Branch instructions are derived from the X Register Logic instructions with Operand A always set to the X Register and Operand B always set to the Immediate value. The X Register is not affected by any of these instructions. The displacement field is reduced to 5 bits (+/−32 instructions)

Usage:

See Destination Lookup Instruction example
SKIP.w ; ignore the next word field

Other Branch Instructions

| 31–29 | 28–26 | 25–24 | 23–16 | 15–4 | 3–0 |
|---|---|---|---|---|---|
| 0 1 0 | Cond | Size | Disp | ExtCond | ExtDisp |

| Cond/Size/Disp/ExtCond/ExtDisp. | |
|---|---|
| 100 00 $00 $000 0 DWAIT | |
| | Wait for DALE |
| 100 00 $00 $800 0 SWAIT | |
| | Wait for SALE |
| 101 00 $00 $C00 0 FWAIT | |
| | Wait for Snoop FIFO done |
| 101 00 ddd $400 0 BCSERR ddd | |
| | Branch on checksum error |
| 011 01 $01 $000 0 SKIP.b | |
| | Skip Byte (same as IBRA.b +1) |
| 011 10 $01 $000 0 SKIP.w | |
| | Skip Word (same as IBRA.w +1) |
| 011 01 ddd $000 0 IBRA.b Label | |
| | Increment Byte and Branch Always |
| 011 10 ddd $000 d IBRA.w Label | |
| | Increment Word and Branch Always |
| 011 00 000 $800 0 SWITCH | |
| | Switch on X (add X to PC) |
| 011 00 ddd $000 d BRA.u Label | |
| | Branch Always |

These instructions are derived from the conditional branch instructions. Wait instructions loop until the extended condition is false. Skip instructions move to the next instruction and increment the IP appropriately.

More branch instructions can be defined easily by using Cond=100 or 101 and picking an unused ExtCond pattern.

When Cond=011 (True), the displacement field is extended to 12 bits.

The SWITCH instruction adds the least significant nibble of X to the PC. If X(3:0)=0, 16 is added to the PC.

Usage:

| SKIP.w | ; ignore the next word field |
|---|---|
| Index Pointer/Register Select Instructions | |

Index Pointer/Register Select Instructions

| 31–29 | 28–26 | 25–24 | 23–21 | 20–18 | 17–16 | 15–0 |
|---|---|---|---|---|---|---|
| Group | Dest | Oper | LSel | ASel | BSel | Immediate Value (15–0) or Register Select (15–4) |

| Group/Dest./Oper/LSel/ASel/BSel | | | |
|---|---|---|---|
| 001 110 00 111 000 00 | ST | X[,XPn,LPn] | |
| | | X -> XP, optionally switch to XPn,LPn | |
| 001 001 00 111 100 00 | LD | X{,XPn,LPn] | |
| | | XP -> X, optionally switch to XPn,LPn | |
| 001 011 00 111 000 00 | RSEL | XPn,LPn | |
| | | switch to XPn,LPn | |
| 000 011 10 111 000 01 | LOADIP | # Value | |
| | | Load IP immediate | |
| 000 011 10 111 001 00 | LOADIP | X | |
| | | Load IP with X | |

Index Pointer instructions are used to perform manipulations on the index pointer.

Transfers from the X registers are not normally used in a lookup function but may be useful for general purpose transfers from interface RAM.

The Register Select instruction selects a register from each of the register banks. The format of the Bank Select Bits field is:

| 15–12 | 11 | 10–8 | 7 | 6–4 | 3–0 |
|---|---|---|---|---|---|
| X X X X | XEn | XSel | LPEn | LPSel | X X X X |

The En bits determine whether the corresponding select bits are valid. If En is zero, the corresponding register selection remains unchanged. If En is one, the corresponding select bits are used. This mechanism allows register selections to be made independent of each other.

Destination Lookup Instructions

| 31–29 | 28–26 | 25–24 | 23–21 | 20–18 | 17–16 | 15–0 |
|---|---|---|---|---|---|---|
| 0 0 1 | 0 1 0 | Size | 1 1 1 | ASel | 0 0 | Command/Address |

Size/ASel

| 00 001 | DLOAD X,Address [,Command] |
|---|---|
| | Load X into DALE |
| 00 000 | DLOAD (IP),Address [,Command] |
| | Load IP indirect into DALE / load Command Reg |
| 10 000 | DLOAD (IP)+,Address [,Command] |
| | Load IP indirect autoinc into DALE / load Command Reg |

| 31–29 | 28–26 | 25–24 | 23–21 | 20–18 | 17–16 | 15–0 |
|---|---|---|---|---|---|---|
| 0 0 1 | Dest | 0 0 | 1 1 0 | 0 0 0 | 1 0 | not used |

| Dest | | |
|---|---|---|
| 111 | DMOVE LP | |
| | Move DALE result pointer into Lookup Pointer | |
| 001 | DMOVE X | |
| | Move DALE result pointer into X Register | |
| 100 | DMOVE Y | |
| | Move DALE result pointer into Y Register | |

The destination lookup instructions set up the DALE and read results from it. The currently selected lookup pointer is used as the root pointer.

The DLOAD instruction loads words into the 16 by 16 bit DALE Nibble RAM and loads the Command Register. The DMOVE instruction returns the DALE result.

Command Register

| 15 | 14 | 13–12 | 11–4 | 3–0 |
|---|---|---|---|---|
| Start | 0 | Nibble Offset | 0 0 0 0 0 0 0 0 | Address |

The Start bit signals the DALE to start the lookup.

The Nibble Offset field points to the first valid nibble in the first word loaded into the Address RAM.

The Address field points to the word being written in Nibble RAM.

The DMOVE instruction gets the 16 bit DALE result pointer. DMOVE should be preceded by DWAIT, otherwise the result may be invalid.

Usage:

| LOADIP | #StartOfPacket | ; point to start of packet |
|---|---|---|
| DLOAD | (IP)+, Word1 | ; load DA word 1 |
| DLOAD | (IP)+,Word2 | ; load DA word 2 |
| DLOAD | (IP)+,Word3,Start | ; load DA word 3 and start lookup |
| . . . | | ; do other stuff |
| DMOVE | X | ; get result |
| BXNE | #Null,DAFound | ; address found in table |

Source Lookup Instructions

| 31–29 | 28–26 | 25–24 | 23–21 | 20–18 | 17–16 | 15–0 |
|---|---|---|---|---|---|---|
| 0 0 1 | 0 1 0 | Size | 1 1 1 | ASel | 0 1 | Command/Address |

Size/ASel

| 00 001 | SLOAD X,Address [,Command] |
|---|---|
| | Load X into SALE |
| 00 000 | SLOAD (IP),Address [,Command] |
| | Load IP indirect into SALE / load Command Word |
| 10 000 | SLOAD (IP)+,Address [,Command] |
| | Load IP indirect autoinc into SALE / load Command Word |

| 31–29 | 28–26 | 25–24 | 23–21 | 20–18 | 17–16 | 15–0 |
|-------|-------|-------|-------|-------|-------|------|
| 0 0 1 | Dest  | 0 0   | 1 1 0 | 0 0 1 | 1 0   | Immediate Value (15–0) |

| Dest | |
|------|---|
| 111  | SMOVE LP |
|      | Move SALE result pointer into Lookup Pointer |
| 001  | SMOVE X |
|      | Move SALE result pointer into X Register |
| 100  | SMOVE Y |
|      | Move SALE result pointer into Y Register |

The destination lookup instructions set up the SALE and read results from it. The currently selected lookup pointer is used as the root pointer.

The SLOAD instruction loads words into the 16 by 16 bit SALE Nibble RAM and loads the Command Word. The SMOVE instruction returns the SALE result.

Command Word

| 15 | 14 | 13–12 | 11–4 | 3–0 |
|----|----|-------|------|-----|
| Start | 0 | Nibble Offset | 0 0 0 0 0 0 0 0 | Address |

The Start bit signals the SALE to start the lookup.

The Nibble Offset field points to the first valid nibble in the first word loaded into the Address RAM.

The Address field points to the word being written in Address RAM.

The SMOVE instruction gets the 16 bit SALE result pointer. The SMOVE instruction should be preceded by SWAIT, otherwise the result may be invalid.

Usage:

```
SLOAD   (IP)+,Word1          ; load DA word 1
SLOAD   (IP)+,Word2          ; load DA word 2
SLOAD   (IP)+,Word3,Start
                             ; load DA word 3 and start lookup
...                          ; do other stuff
SWAIT                        ; wait for SALE to finish
SMOVE   X                    ; get result
BXNE    #Null,SAFound        ; address found in table
```

Checksum Engine Instructions

| 31–29 | 28–26 | 25–24 | 23–21 | 20–18 | 17–16 | 15–0 |
|-------|-------|-------|-------|-------|-------|------|
| 0 0 1 | 0 1 0 | Size  | 1 1 1 | ASel  | 1 0   | $8000 |

| Size/ASel | | |
|-----------|---|---|
| 00 001 | CLOAD X | |
|        | Load X into Checksum Engine and start | |
| 00 000 | CLOAD (IP) | |
|        | Load IP indirect into Checksum Engine and start | |
| 10 000 | CLOAD (IP)+ | |
|        | Load IP indirect autoinc into Checksum Engine and start | |

The CLOAD instruction loads a word count into the checksum engine, clears the checksum and starts the engine. The word currently indexed by IP is subsequently added to the checksum each time the IP crosses a word boundary until the count is exhausted.

Miscellaneous Instructions

| 31–29 | 28–16 | 15–0 |
|-------|-------|------|
| 1 1 1 | 0 0 0 0 0 0 0 0 0 0 0 0 0 | Code (2–0) |

These instructions invoke special functions

| Code | |
|------|---|
| 001  | STOP |
|      | Stop execution until next lookup request |

Figure 17:
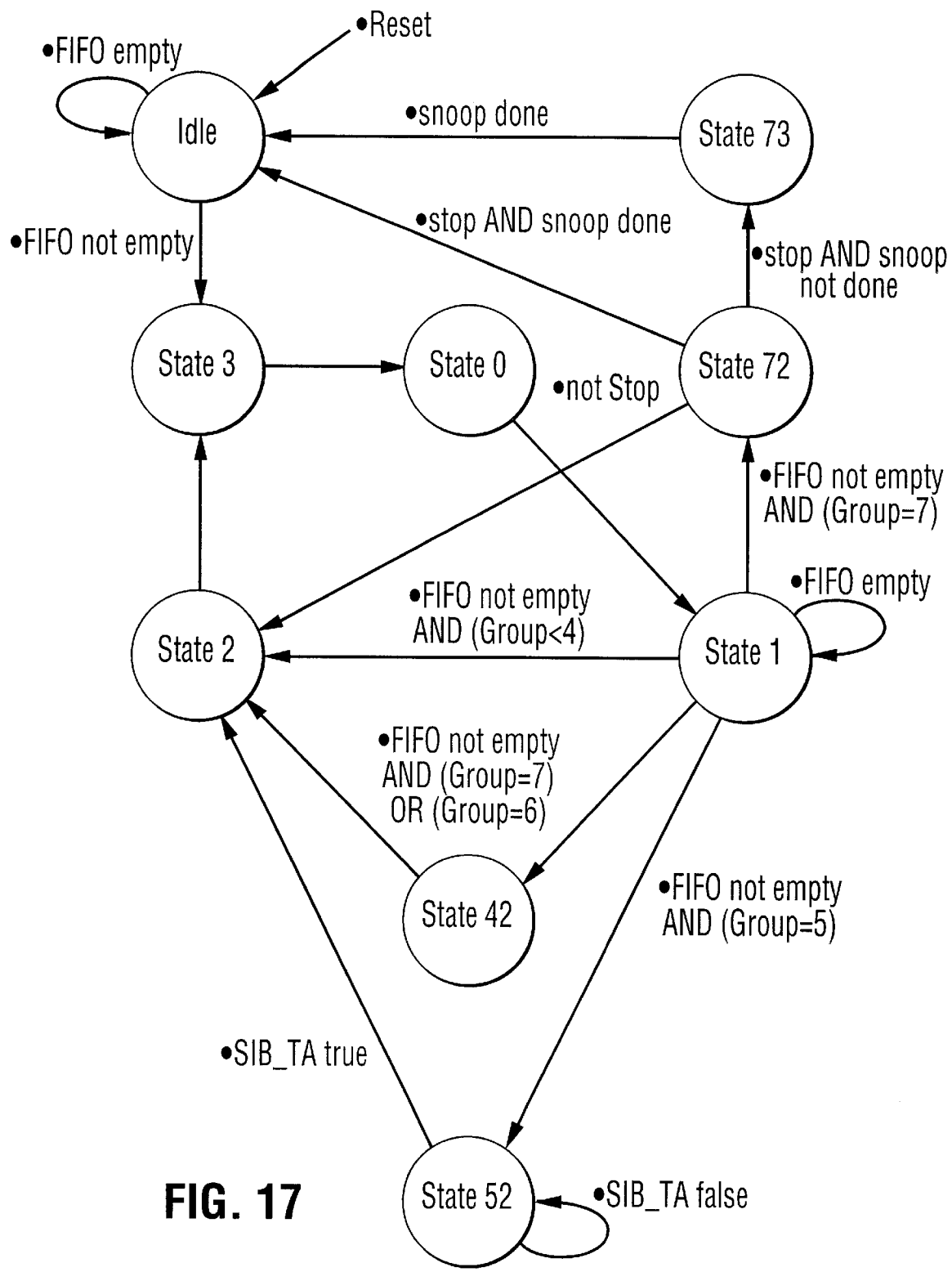
FIG. 17 shows a look-up engine controller Instruction State Machine.

The lookup engine operation will now be described in more detail. The instruction State Machine (ISM) is shown in FIG. 17.

A lookup engine microcode will typically take four clock cycles. At 50 MHz, the instruction cycle takes 80 ns to execute. Instructions that require access to SIB RAM, which require arbitration with the Control Processor, and any future extensions that require more time to execute will require one or more additional cycles to complete.

After reset, the 3 LEC is in the idle state. As soon as one of the snoop FIFOs 42, 43 is non-empty, the ISM enters the main instruction cycle loop.

A microcode instruction cycle is typically divided into four main states. State 3 and State 0 allow the microcode contents to propagate through the LEC. The instruction group is determined in State 1. If a fast instruction is being executed (Groups 0–3), State 2 is entered immediately. Otherwise the appropriate next state is entered according to the Group field.

Figure 18:
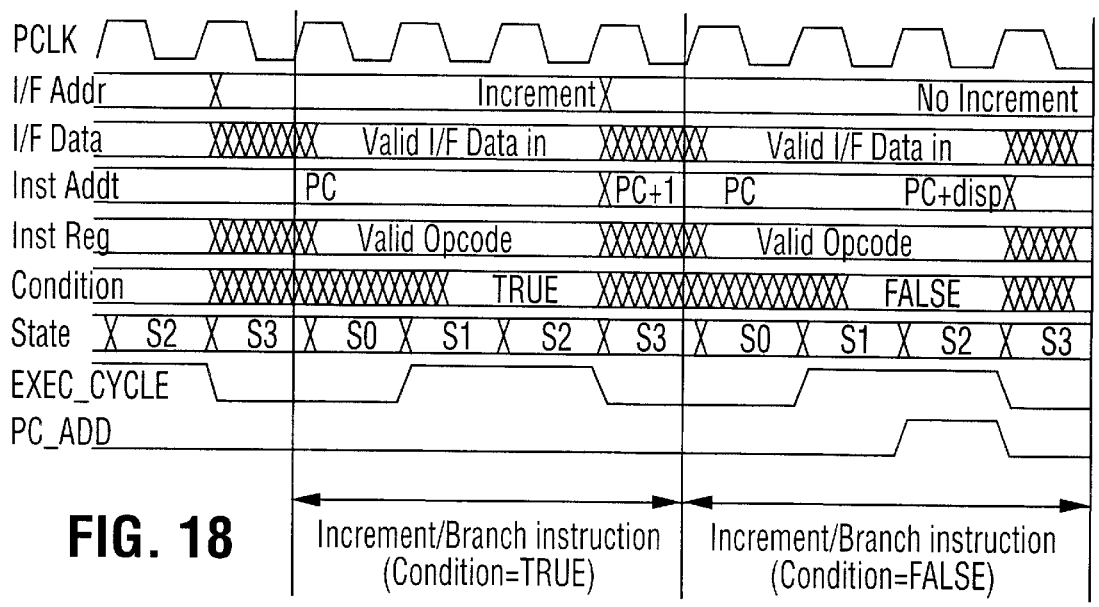
FIG. 18 shows a typical fast timing diagram.

FIG. 18 shows a typical fast instruction.

By the time State 2 is reached, all signals will have settled. New values for the PC and if necessary, the IP and/or the selected destination, are loaded at the end of this state.

State 42 is a dummy state for currently undefined groups.

State 52 is a wait state for external accesses to SIB RAM. The ISM exits this state when the SIB RAM has been granted to the LEC long enough for an access to complete.

Figure 19:
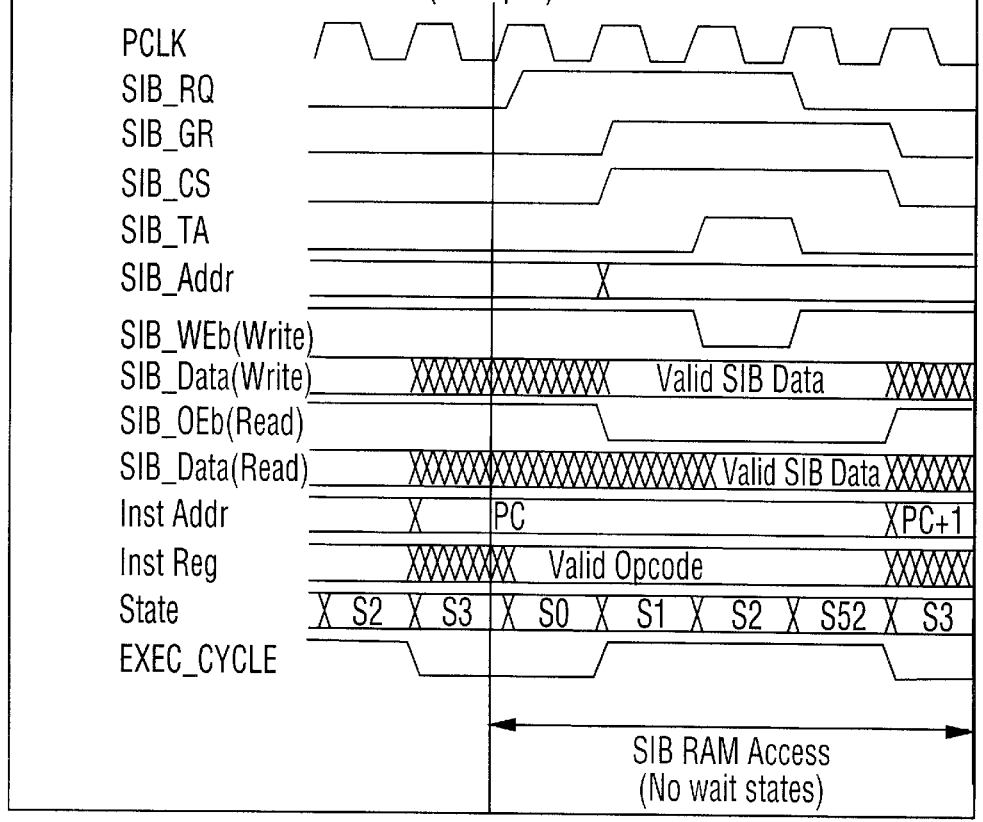
FIG. 19 shows a typical SIB RAM access instruction timing diagram.

FIG. 19 shows a typical SIB RAM access instruction.

States 72 and 73 are executed during the STOP instruction. State 73 flushes the snoop FIFOs in case.

The LEC cycles through States 0 to 3 indefinitely until a STOP instruction is encountered, which brings the LEC back to the idle state.

The lookup request mechanism for a MAC layer lookup is as follows:

The requester (e.g. the AXE) places information, generally a packet header, into the snoop FIFO.

The empty flag of the FIFO kickstarts the LEC.

The LEC instructs the DALE to look up the destination address.

The LEC instructs the SALE to look up the source address.

The LEC looks into the packet to determine the network layer protocol in case it needs to be forwarded.

The LEC waits for the SALE and reads the Source Address SIB pointer.

The source port is compared against the previously stored portset to see if the source endstation has moved.

The LEC waits for the DALE and reads the Destination Address SIB pointer.

The destination area is compared to the source area to see if the endstations are in the same area.

The source port is compared against the destination port to see if the endstations are on the same port.

Packets are discarded if they serve no other useful purpose (e.g. SA and DA on the same port or in different areas, errored packets). Otherwise they are sent to the Control Processor for further processing.

Sample Program

```
;------------------------------
; File: BDG.a
; Unicast Bridging Case
; Release 1.1 Functionaiity
;------------------------------
BDG_Start:
;XO = Packet Status Word
;IP = Points to 2nd byte of PSW
;DR = Contains Packet Status Word
;XO, LPO are default XP, LP
        MOVE    $8000,LP        ;Look up Destination MAC
        DLOAD   (IP)+,0         ;Load Dst Addr bits 0-15
        DLOAD   (IP)+,1         ;Load Dst Addr bits 16-31
                                ;Load Dst Addr bits 32-47
        DLOAD   (IP)+,2,$8000   ;and start lookup
        MOVE    $8000,LP        ;Look up Source MAC
        SLOAD   (IP)+,0         ;Load Src Addr bits 0-15
        SLOAD   (IP)+,1         ;Load Src Addr bits 16-31
                                ;Load Src Addr bits 32-47
        SLOAD   (IP)+,2,$8000   ;and start lookup
; determine protocol here
        ESCGE.w  1500,          ;check if 802.3 format
                 CheckEnetType
        ESCNE.w  $AAAA,         ;check DSAP/SSAP
                 UnknownType
        ESCNE.w  $0300,         ;check CTL field
                 SNAPUnknown-
                 Type
        ESCNE.w  $0000,
                 SNAPUnknown-
                 Type
        ESCNE.w  $0800,         ;check protocol type field
                 SNAPUnknown-
                 Protocol
; It's IP over SNAP
BdgSNAPIP:
        CLOAD 5                 ;assume IP
                                header length is
                                5
        ESCNE.w  $4500,         ;check IP header
                 BdgSNAPIP_
                 withOpts
        SKIP.w                  ;skip length
        SKIP.w                  ;skip identifica-
                                tion
        SKIP.w                  ;skip offset
        ESCLE.b  $01,           ;check TTL
                 BdgSNAPIP_
                 TTLExpired
        SKIP.b                  ;skip protocol
        SKIP.w                  ;skip checksum
        MOVE    (IP)+,X         ;read NLSA
        MOVE    R12(X),X        ;shift first nibble
                                to bottom
        SWITCH                  ;check IP Class
        BRA.u    BdgSNAPIP-     ;0xxx = Class A address
                 ClassA
        BRA.u    BdgSNAPIP-
                 ClassA
        BRA.u    BdgSNAPIP-
                 ClassA
        BRA.u    BdgSNAPIP-
                 ClassA
        BRA.u    BdgSNAPIP-
                 ClassA
        BRA.u    BdgSNAPIP-
                 ClassA
        BRA.u    BdgSNAPIP-
                 ClassA
        BRA.u    BdgSNAPIP-     ;10xx = Class B address
                 ClassB
        BRA.u    BdgSNAPIP-
                 ClassB
        BRA.u    BdgSNAPIP-
                 ClassB
        BRA.u    BdgSNAPIP-
                 ClassB
```

-continued

| | | |
|---|---|---|
| BRA.u | BdgSNAPIP-ClassC | ;110x = Class C address |
| BRA.u | BdgSNAPIP-ClassC | |
| BRA.u | BdgSNAPIP-ClassD | ;1110 = Class D address |
| BRA.u | BdgSNAPIP-ClassE | ;1111 = Class E address (future) |
| BRA.u | BdgSNAPIP-ClassA | ;0xxx = Class A Address |
| BdgSNAPIPClassA: | | |
| OR | X,$FF00,X | ;check if broadcast |
| BXNE | $FFFF, BdgSNAPIP__NLSARealign | |
| MOVE | (IP)+,X | ;check lower address word |
| BXEQ | $FFFF, BdgSNAPIP__NLSAInvalid | ;all ones host address |
| BRA.u | BdgSNAPIP__NLSAValid | ;broadcast SA is not allowed |
| BdgSNAPIP__NLSARealign: | | |
| SKIP.w | | |
| BRA.u | BdgSNAPIP__NLSAValid | |
| BdgSNAPIPClassB: | | |
| MOVE | (IP)+,X | ;check lower address word |
| BXNE | $FFFF, BdgSNAPIP__NLSAValid | |
| BRA.u | BdgSNAPIP__NLSAValid | |
| BdgSNAPIPClassC: | | |
| MOVE | (IP)+,X | ;check lower address byte |
| OR | X,$FF00,X | ;check if broadcast |
| BXEQ | $FFFF, BdgSNAPIP__NLSAInvalid | |
| BRA.u | BdgSNAPIP__NLSAValid | |
| BdgSNAPIPClassD: | | |
| SKIP.w | | |
| BRA.u | BdgSNAPIP__NLSAValid | |
| BdgSNAPIP__NLSAInvalid | | |
| SWAIT | | ;clean up after SALE and DALE |
| DWAIT | | |
| OR | XP,CMD__DISCARD \| CMD__UNICAST,Y | ;Load command Word |
| MOVEF | Y, FIRST | ;Send Command Word |
| MOVEF | NULL_CI | ;Send CI Index |
| MOVEF | PORT_CP | ;Dest Port is CP |
| MOVEF | RSN_FRC__MAC_SRC__INVALID | ;Send Reason |
| STOP | | |
| BdgSNAPIP__NLSAValid: | | |
| SKIP.w | | ;skip NLDA |
| SKIP.w | | |
| BCSERR BDG__SNAPIP__CSError | | |
| RSEL | LP1 | ;Store source SIB pointer in LP1 |
| SWAIT | | |
| SMOVE | Y | ;Y contains SALE result |
| MOVE | Y,LP,LP2 | ;LF1 points to Source Addr SIB ;Store dest SIB pointer in LP2 |
| BYNZ | BDG__SrcHit | |
| BDG__SrcMiss: | ;*** Source Cache Miss *** | |
| OR | XP,CMD__FWDCP \| CMD__UNICAST,Y | ;Load command word |
| | | ;Default MAC Ethernet Type ;Default Low priority |
| MOVEF | Y, FIRST | ;Send Command Word |

```
            MOVEF      NULL_CI        ;Send CI Index
            MOVEF      PORT_CP        ;Dest Port is CP
            MOVEF      RSN_FRC_       ;Send Reason
                       MAC_SRC_
                       MISS
            STOP                      ;Done!!!
BDG_SNAPIP_
CSError:
            OR         XP,CMD_        ;Load command Word
                       DISCARD |
                       CMD_
                       UNICAST,Y
            MOVEF      Y, FIRST       ;Send Command Word
            MOVEF      NULL_CI        ;Send CI Index
            MOVEF      PORT_CP        ;Dest Port is CP
            MOVEF      RSN_FRC_       ;Send Reason
                       MAC_CSERR
            STOP
BDG_SrcHit:
            DWAIT
            DMOVE      Y              ;Get DALE result
            MOVE       Y,LP,LP1       ;point to source SIB
            BYNZ       BDG_           ;and check source port
                       CheckSrcPort
BDG_DestMiss:         ;*** Destination
                       Cache Miss ***
            OR         XP,CMD_        ;Load command Word
                       FWDCP |
                       CMD_
                       UNICAST,Y
                                      ;Default MAC Ethernet Type
                                      ;Default Low priority
            MOVEF      Y, FIRST       ;Send Command Word
            MOVEF      NULL_CI        ;Send CI Index
            MOVEF      PORT_CP        ;Dest Port is CP
            MOVEF      RSN_FRC_       ;Send Reason
                       MAC_DST_
                       MISS
            STOP                      ;Done!!!
BDG_CheckSrcPort:
            GET        SIB_MAC_       ;Compare portsets in LP => Src SIB
                       PORTSET(LP)
            AND        S,PSET(X),Y    ;Y = src addr bit AND src port bit
            BYNZ       BDG_           ;source moved if bits don't match
                       CheckDestArea
BDG_SrcMove:          ;*** Source
                       Moved ***
            OR         XP,CMD_        ;Load command Word
                       FWDCP |
                       CMD_
                       UNICAST,Y
                                      ;Default MAC Ethernet Type
                                      ;Default Low priority
            MOVEF      Y, FIRST       ;Send Command Word
            MOVEF      NULL_CI        ;Send CI Index
            MOVEF      PORT_CP        ;Dest Port is CP
            MOVEF      RSN_FRC_       ;Send Reason
                       SRC_MOVED
            STOP                      ;Done!!!
BDG_CheckDestArea:
            RSEL       LP2            ;point to dest SIB
            GET        SIB_PROTO_     ;get IP Dest Area
                       AREA_1(LP)
            AND        S,MASK_
                       AREA,Y;Mask
                       off top 4 bits
            BYNZ       BDG_
                       CheckSrcArea
BDG_DestAreaInvalid: ;*** Destination
                       Area Invalid ***
            LD         X
            OR         X,CMD_         ;Load command Word
                       DISCARD |
                       CMD_
                       UNICAST,Y
;Default MAC Ethernet
Type
;Default Low priority
;Default Multicast
            MOVEF      Y, FIRST       ;Send Command Word
            MOVEF      NULL_CI        ;Send CI Index
            MOVEF      PORT_CP        ;Dest Port is CP
```

```
       MOVEF           RSN_DRC_       ;Send Reason
                       DST_AREA_
                       INV
       STOP            ;Done!!!
BDG_CheckSrcArea:
       RSEL            LP1            ;get ready for Source Addr check
       GET             SIB_PROTO_
                       AREA_1(LP)
       OR              S,SIB_AREA_    ;set PA bit in SIB_IPAREA
                       PROTO_
                       ACTIVE,X
       MOVE            X,SIB_         ;modify
                       PROTO_
                       AREA_1(LP)
       AND             X,MASK_        ;Mask off top 4 bits
                       AREA, X
       XOR             X,Y,Y,LP2      ;check against Dest Area
;switch to LP2 (Dest
SIB)
       BYZ             BDG_
                       CheckDestPort
BDG_SrcAreaInvalid:    ;*** Source
                       Area Invalid ***
       OR              XP,CMD_        ;Load command Word
                       DISCARD |
                       CMD_
                       UNICAST,Y
;Default MAC Ethernet
Type
;Default Low priority
;Default Multicast
       MOVEF           Y, FIRST       ;Send Command Word
       MOVEF           NULL_CI        ;Send CI Index
       MOVEF           PORT_CP        ;Dest Port is CP
       MOVEF           RSN_DRC_       ;Send Reason
                       SRC_AREA_
                       INV
       STOP            ;Done!!!
BDG_CheckDestPort:
       ;X0, LP2 are
default XP, LP
       LD              X              ;restore PSW
       GET             SIB_MAC_       ;S = dest address portset
                       PORTSET(LP)
       AND             S, PSET(X),Y   ;compare against source port portset
       BYZ             BDG_OK
BDG_SamePort:          ;*** Src Port =
                       Dest Port ***
       OR              XP,CMD_        ;Load command Word
                       DISCARD |
                       CMD_
                       UNICAST,Y
;Default MAC Ethernet
Type
;Default Low priority
       MOVEF           Y, FIRST       ;Send Command Word
       MOVEF           NULL_CI        ;Send CI Index
       MOVEF           PORT_NULL      ;Dest Port is NULL
       MOVEF           RSN_DRC_       ;Send Reason
                       DST_SAME
       STOP            ;Done !!!
BDG_OK:                ;*** Bridge-
                       router ***
       OR              XP,CMD_        ;Load command Word
                       BRIDGE-
                       ROUTER |
                       CMD_
                       UNICAST,Y
;Default MAC Ethernet
Type
;Default Low priority
       MOVEF           Y, FIRST       ;Send Command Word
       MOVEF           SIB_MAC_CI     ;Send CI Index from dst SIB
                       (LP)
       MOVEF           SIB_MAC_       ;Dest Port is determined from dst SIB
                       PORTSET(LP)
       MOVEF           SIB_MAC_       ;Get MAC Index from dst SIB
                       MACINDEX
                       (LP)
       STOP            ;Done!!!
```

The described look-up engine is capable of performing bridge-router and most network layer look-ups in less than 5.6 μs (1/178,000) with to minimum RAM requirements and cost and maximizes flexibility for future additions/corrections without hardware changes.

The intended application of the look-up engine is high performance LAN systems and other packet-based devices.

GLOSSARY

| | |
|---|---|
| BRIDGE-ROUTER | A LAN bridging-routing device, with 12 ethernet ports and 1 ATM port. |
| ATM | Asynchronous Transfer Mode. A cell relay standard. |
| ABS | Address/Broadcast Server A component of a Route Server that handles address resolution and broadcast traffic. |
| AXE | A Transfer Engine |
| DA | Destination Address. The MAC address of the intended destination of a MAC frame. |
| DALE | Destination Address Look-up Engine. The LUE component that generally searches through a table of MAC layer destination addresses. |
| CI | Connection Identifier. A number internally used to indicate a particular connection. |
| IP | Internet Protocol A popular network layer protocol used by the Internet community. |
| IPX | Internet Packet Exchange A Novell developed network layer protocol. |
| LEC | Look-up Engine Controller. The LUE component that executes microcode. |
| LUE | Look-up Engine. |
| MAC | Medium Access Control. A term commonly encountered in IEEE 802 standards generally referring to how a particular medium (ie. Ethernet) is used. "MAC address" is commonly used to refer to the globally unique 48 bit address given to all interface cards adhering somewhat to the IEEE 802 standards. |
| RS | Route Server. |
| SA | Source Address. The MAC address of the originator of a MAC frame. |
| SALE | Source Address Look-up Engine. The LUE component that generally searches through a table of MAC layer source addresses. |
| SIB | Station Information Block. The data structure in the LUE that holds relevant information about an endstation. |
| CAM | Content Addressable Memory. |
| VPI | Virtual Path Identifier |
| VCI | Virtual Channel Identifier |
| Control Processor | The processor in the Bridge-router that handles management functions |

We claim:

1. An arrangement for parsing packets in a packet-based digital communications network, said packets including packet headers divided into fields having values representing information pertaining to the packet, said arrangement comprising:

a) an input memory for receiving fields from said packet headers of incoming packets; and (b) a look-up engine for retrieving stored information appropriate to a received field value, said look-up engine including:

(i) at least one memory storing information related to possible values of said fields in a hierarchical tree structure and associated with a respective field of packet headers;

(ii) a memory controller associated with each said memory storing information related to possible values of said fields for controlling the operation thereof to retrieve said stored information therefrom; and (iii) a microcode controller for parsing a remaining portion of the packet header while said stored information is retrieved and controlling the overall operation of said look-up engine.

2. An arrangement as claimed in claim 1, wherein said memory controller associated with each said memory compares, at each decision point on the tree structure, the current field with a stored value or range, and moves to the next decision point by moving a pointer for the current field and branching to new code if said comparison results in a first logical condition, and if said comparison results in a second logical condition the current field is compared to a different value or range, and so on until said comparison results in said first logical condition.

3. An arrangement as claimed in claim 1, wherein said controller associated with each said memory compares values based on successive nibbles of a field value in said memory with stored values to locate the related information.

4. An arrangement as claimed in claim 3, wherein said memory controller associated with each said memory concatenates a first nibble of an incoming field value with a root pointer to obtain an index to a root pointer array, retrieves a word at a location identified by said index, concatenates the next nibble with the retrieved word to form the next pointer and so on until said related information is retrieved.

5. An arrangement as claimed in claim 1, wherein said at least one memory is a random access memory (RAM).

6. An arrangement as claimed in claim 1, wherein one of said fields comprises a destination address and said related information comprises the path data associated with said respective destination addresses.

7. An arrangement as claimed in claim 1, wherein a plurality of said memories storing information related to possible values of said fields in a hierarchical tree structure operate in parallel and are associated with respective fields of said packet headers.

8. An arrangement as claimed in claim 7, wherein each said memory is a random access memory (RAM).

9. An arrangement as claimed in claim 7, wherein one of said fields comprises a destination address and said related information comprises the path data associated with said destination address, and another of said fields comprises a source address, and said look-up engine also locates path data associated with the source in parallel with the location of the path data associated with the destination address.

10. An arrangement for parsing packets in a packet-based digital communications network, said packets including packet headers divided into fields having values representing information pertaining to the packet, said arrangement comprising:

(a) an input memory for receiving fields from said packet headers of incoming packets; and (b) a look-up engine for retrieving stored information appropriate to a received field value, said look-up engine including:

(i) a plurality of memories storing information related to possible values of said fields in a hierarchical tree structure and operating in parallel, said memories being associated with respective fields of said packet headers;

(ii) a main controller controlling overall operation of the look-up engine; and (iii) a memory controller associated with each said respective memory for controlling the operation thereof to retrieve said stored information therefrom.

11. An arrangement as claimed in claim 10, wherein said main controller is a microcode.

12. An arrangement as claimed in claim 11, wherein said microcode controller comprises an interface memory for receiving headers of incoming packets, a station information block memory for storing information pertaining to endstations, a microcode memory storing microcode instructions, and logic circuitry for implementing said microcode instructions.

13. An arrangement as claimed in claim 11, wherein said microcode controller parses the remainder of the packet header using a specific instruction set while said information is retrieved from said plurality of memories.

14. An arrangement as claimed in claim 13, wherein said microcode controller comprises separate buses for instructions and data.

15. An arrangement as claimed in claim 14, wherein said microcode controller is arranged to implement optimized instructions that perform bit level logical comparisons and conditional branches within the same cycle and other instructions tailored to retrieving date from nibble-indexed data structures.

16. An arrangement as claimed in claim 15, wherein said microcode controller is implemented as an ASIC processor.

17. An arrangement for parsing packets in a packet-based digital communications network, said packets including packet headers including destination and source address fields, said arrangement comprising:
   (a) an input memory for receiving fields from said packet headers of incoming packets; and
   (b) a look-up engine for retrieving stored information appropriate to a received field value, said look-up engine including:
      (i) a source address look-up engine including a memory storing information related to possible values of said source address field in a hierarchical tree structure;
      (ii) a memory controller associated with said source look-up engine for controlling the operation thereof to retrieve stored information therefrom;
      (iii) a destination address look-up engine including a memory storing information related to possible values of said destination address field in a hierarchical tree structure;
      (iv) a memory controller associated with said destination look-up engine for controlling the operation thereof to retrieve stored information therefrom;
      (v) a processor controlling overall operation of said source and destination address look-up engines, said source and destination address look-up engines and said processor operating in parallel.

18. An arrangement as claimed in claim 17, wherein said processor is a microcode controller.

19. An arrangement as claimed in claim 18, wherein said memory controllers compare, at each decision point on the tree structure, the current field with a stored value or range, and move to the next decision point by moving a pointer for the current field and branching to new code if said comparison results in a first logical condition, and if said comparison results in a second logical condition, the current field is compared to a different value or range, and so on until said comparison results in said first logical condition.

20. An arrangement for parsing packets in a packet-based digital communications network, said packets including packet headers including destination and source address fields, said arrangement comprising:
   (a) an input memory for receiving fields from said packet headers of incoming packets; and
   (b) a look-up engine for retrieving stored information appropriate to a received field value, said look-up engine including:
      (i) a source address look-up engine including a memory storing information related to possible values of said source field in a hierarchical tree structure;
      (ii) a memory controller associated with said source look-up engine for controlling the operation thereof to retrieve stored information therefrom;
      (iii) a destination address look-up engine including a memory storing information related to possible values of said destination field in a hierarchical tree structure and an associated memory controller;
      (iv) a memory controller associated with said destination look-up engine for controlling the operation thereof to retrieve stored information therefrom; and
      iii) a microcode processor controlling overall operation of said source and destination address look-up engine, said source and destination address look-up engines and said processor operating in parallel, and said microcode processor being arranged to parse additional fields in said packet header while said source and destination address look-up engines retrieve said related information.

21. An arrangement as claimed in claim 20 wherein said microcode processor comprises an interface memory for receiving said incoming packets, a station information block memory for storing information pertaining to endstations, a microcode memory storing microcode instructions, and logic circuitry for implementing said instructions.

22. A method of parsing packets in a packet-based digital communications network, said packets including packet headers divided into fields having values representing information pertaining to the packet, comprising the steps of:
   (a) receiving fields of packet headers from incoming packets in an input memory;
   (b) retrieving stored information appropriate to a received field value by performing a tree search in a look-up engine having at least one memory storing information related to possible values of said fields in a hierarchical tree structure and associated with a respective field of packet headers, said at least one memory being controlled by a memory controller associated therewith to retrieve said stored information therefrom; and
   (c) parsing a remaining portion of the packet header while said stored information is being retrieved from said at least one memory with a main controller, which main controller also controls the overall operation of said look-up engine.

23. A method as claimed in claim 22, wherein at each decision point in the tree search, in retrieving said information the current field is compared with a stored value or range, a pointer for the current field is moved and branched to new code if said comparison results in a first logical condition, and if said comparison results in a second logical condition, the current field is compared to a different value or range, and so on until said comparison results in said first logical condition.

24. A method as claimed in claim 22, wherein values based on successive nibbles of a field value are compared with stored values to locate the related information.

25. A method as claimed in claim 24, wherein a first nibble of an incoming field value is concatenated with a root pointer to obtain an index to a root pointer array, a word at a location identified by said index is retrieved, the next nibble is concatenated with the retrieved word to form the next pointer and so on until said related information is retrieved.

26. A method as claimed in claim 22, wherein information related to a plurality of fields is retrieved in parallel.

27. A method as claimed in claim 26, wherein one of said fields comprises a destination address and said related information comprises the path data associated with said respective destination address, and another of said fields comprises a source address and said related information comprises the path data associated with said source address.

28. A method of parsing packets in a packet-based digital communications network, said packets including packet headers divided into fields having values representing information pertaining to a packet, comprising the steps of:

(a) storing in memory information related to possible values of said fields in a hierarchical tree structure;

(b) receiving a plurality fields from said packet headers of incoming packets, one of said fields being a destination address and said related information therefor comprising path data associated with said respective destination address, and another of said fields being a source address and said related information therefor comprising path data associated with said source address;

(c) retrieving in parallel said stored information appropriate to received field values by performing a tree search under the control of a microcode controller; and (d) parsing a remaining portion of the packet header using a specific instruction set while said related information is retrieved.

29. An arrangement as claimed in claim 1, wherein said at least one memory provides table look-ups using nibble indexing for variable portions of the packet header and said microcode controller employs bit pattern recognition on fixed portions of the packet header for network layer protocol determination.

* * * * *